(12) United States Patent
Ochi et al.

(10) Patent No.: US 7,876,373 B2
(45) Date of Patent: Jan. 25, 2011

(54) CAMERA WITH VIEWFINDER

(75) Inventors: Masahito Ochi, Chiba (JP); Hisashi Sano, Tokyo (JP); Toshiaki Maeda, Yokohama (JP); Kazuma Hosoi, Narashino (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 753 days.

(21) Appl. No.: 11/907,088

(22) Filed: Oct. 9, 2007

(65) Prior Publication Data
US 2008/0084484 A1 Apr. 10, 2008

(30) Foreign Application Priority Data
Oct. 10, 2006 (JP) .............................. 2006-276637

(51) Int. Cl.
H04N 5/222 (2006.01)
G03B 13/02 (2006.01)

(52) U.S. Cl. .................................. 348/333.01; 396/374
(58) Field of Classification Search ........................ None
See application file for complete search history.

(56) References Cited

U.S. PATENT DOCUMENTS

| | | | | |
|---|---|---|---|---|
| 6,037,972 A * | 3/2000 | Horiuchi et al. | ................ | 348/64 |
| 6,441,854 B2 * | 8/2002 | Fellegara et al. | ........ | 348/333.13 |
| 6,507,711 B2 * | 1/2003 | Maruyama | ................... | 396/374 |
| 7,593,634 B2 * | 9/2009 | Terada | ......................... | 396/257 |
| 2007/0084493 A1 * | 4/2007 | Prusmack | ................... | 135/135 |
| 2007/0242942 A1 * | 10/2007 | Nozaki et al. | ................ | 396/123 |
| 2007/0248345 A1 * | 10/2007 | Nozaki et al. | ................ | 396/123 |
| 2008/0088729 A1 * | 4/2008 | Ochi et al. | ............. | 348/333.01 |

FOREIGN PATENT DOCUMENTS

| | | |
|---|---|---|
| JP | A 05-145818 | 6/1993 |
| JP | A 08-063597 | 3/1996 |
| JP | A 2001-016573 | 1/2001 |

* cited by examiner

*Primary Examiner*—Justin P Misleh
(74) *Attorney, Agent, or Firm*—Oliff & Berridge, PLC

(57) ABSTRACT

A camera includes a first image pickup section that photographs a recording-purpose image, a viewfinder optical system, a second image pickup section, a mounting section, a display processing section, a displaying section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The mounting section acquires focal-length information of an interchangeable lens. The display processing section executes display processing that superimposes a frame indicating a range of a field angle of the first image pickup section, onto the view confirming image. The displaying section provides the eyepiece section with the view confirming image having been processed with the display processing. The controlling section switches between a first state to provide the eyepiece section with the optical image and a second state to provide the eyepiece section with the view confirming image. Then, the displaying section changes a size of a frame based on the focal-length information when in the second state.

22 Claims, 15 Drawing Sheets

CAMERA WITH VIEWFINDER

CROSS-REFERENCE TO RELATED APPLICATION

This application is based upon and claims the benefit of priority from Japanese Patent Application No. 2006-276637, filed on Oct. 10, 2006, the entire content of which is incorporated herein by reference.

BACKGROUND

1. Field

The present invention relates to cameras having a viewfinder suitable for telescopic photographing and the like.

2. Description of the Related Art

Conventionally, a digital camera can determine a photographing composition by displaying an image currently photographed onto a display device, such as an LCD monitor. Especially in a video camera, there is also known a camera, wherein an auxiliary photographing section that photographs a wide angle image for viewfinder display is provided independently of a recording-purpose image pickup section. In addition, Japanese Unexamined Patent Application Publication No. Hei-5-145818 is listed as an example of the above-described camera.

Incidentally, the conventional single lens reflex camera includes a TTL (Through The Lens) optical viewfinder that observes an image of a subject with a reflected light from a movable mirror disposed on a photographing optical path. With such an optical viewfinder, the state of a subject through an optical shooting system can be confirmed as it is, however, when the field angle of the optical shooting system is narrow as in telescopic photographing, the field of view becomes extremely narrow. For this reason, a camera configured to observe a wide angle electronic image from an eyepiece section of the above-described optical viewfinder has also been studied.

In the camera configured to observe a wide angle electronic image from the eyepiece section of the optical viewfinder, the display area of an electronic image usually does not coincide with the field angle of the optical shooting system, so it is requested that the field angle of the optical shooting system can be known on an electronic image.

Moreover, in the camera configured to observe a wide angle electronic image from the eyepiece section of the optical viewfinder, if the display of an electronic image of the viewfinder can be switched depending on the situation, the convenience of a camera will be improved further.

SUMMARY

The present invention has been made to solve at least one of the above-described problems of the prior art. One of the objects of the present invention is to provide a means capable of confirming the state of field and the photographing area of an image pickup section in a camera capable of observing an electronic image through an optical viewfinder.

Moreover, one of the objects of the present invention is, in a camera capable of observing an electronic image through an optical viewfinder, to provide a means capable of acquiring various kinds of information depending on the situation without detaching eyes from the viewfinder.

A camera according to a first invention includes a first image pickup section that photographs a recording-purpose image, a viewfinder optical system, a second image pickup section, a mounting section, a display processing section, a displaying section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The mounting section can mount and dismount an interchangeable lens and acquires focal-length information of an interchangeable lens. The display processing section executes display processing that superimposes a frame indicating a range of a field angle of the first image pickup section, onto the view confirming image. The displaying section provides the eyepiece section with the view confirming image having been processed with the display processing. The controlling section switches between a first state to provide the eyepiece section with the optical image and a second state to provide the eyepiece section with the view confirming image. Then, the displaying section changes a size of a frame based on the focal-length information when in the second state.

According to a second aspect of the invention, a camera includes a first image pickup section that photographs a recording-purpose image, a viewfinder optical system, a second image pickup section, a mounting section, a display processing section, a displaying section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The mounting section can mount and dismount an interchangeable lens and acquires focal-length information of an interchangeable lens. The display processing section executes display processing that superimposes a frame indicating a range of a field angle of the first image pickup section, onto the view confirming image. The displaying section provides the eyepiece section with the view confirming image having been processed with the display processing. The controlling section switches between a first state to provide the eyepiece section with the optical image and a second state to provide the eyepiece section with the view confirming image. Then, the displaying section fixes the size of the frame when in the second state and also changes the display of the view confirming image based on the focal-length information.

According to a third aspect of the invention, in the first or second aspect of the invention the camera further includes a zooming section. The zooming section adjusts a display area of the view confirming image by optically or electronically changing a magnifying power of the second image pickup section.

According to a fourth aspect of the invention, in the third aspect of the invention the displaying section performs a warning indication indicative of a limit of the variable range of the magnifying power on a telescopic side or on a wide-angle side of the zooming section, based on the focal-length information.

According to a fifth aspect of the invention, in the first or second aspect of the invention the display processing section adjusts a display area by distorting the view confirming image by image processing.

According to a sixth aspect of the invention, in the first or second aspect of the invention the display processing section executes display processing that superimposes an indication indicative of a focal length of the second image pickup section onto the view confirming image.

According to a seventh aspect of the invention, in the first or second aspect of the invention the camera further includes a calculating section. The calculating section calculates parallax between the first image pickup section and the second image pickup section based on the focal-length information. Then, the display processing section electronically corrects the position of the frame with respect to the view confirming image based on a data of the parallax.

According to an eighth aspect of the invention, in the first or second aspect of the invention the camera further includes a calculating section. The calculating section calculates parallax between the first image pickup section and the second image pickup section based on the focal-length information. Then, the display processing section electronically corrects a display area of the view confirming image based on a data of the parallax.

According to a ninth aspect of the invention, a camera includes a first image pickup section that photographs a recording-purpose image, a viewfinder optical system, a second image pickup section, a zooming section, a displaying section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The zooming section adjusts a display area of the view confirming image by electronically changing a magnifying power of the second image pickup section. The displaying section provides the eyepiece section with the view confirming image. The controlling section switches between a first state to provide the eyepiece section with the optical image and a second state to provide the eyepiece section with the view confirming image.

A camera according to a tenth invention includes a first image pickup section that photographs a recording-purpose image, a viewfinder optical system, a second image pickup section, a displaying section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The displaying section provides the eyepiece section with the view confirming image. The controlling section switches between a first state to provide the eyepiece section with the optical image and a second state to provide the eyepiece section with the view confirming image and also causes the displaying section to display the recording-purpose image after photographing of the recording-purpose image.

A camera according to an eleventh invention includes a first image pickup section that photographs a recording-purpose image, a viewfinder optical system, a second image pickup section, a displaying section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The displaying section provides the eyepiece section with the view confirming image. The controlling section switches between a first state to provide the eyepiece section with the optical image and a second state to provide the eyepiece section with the view confirming image and also causes the displaying section to display at least one of a reproduced image of the recording-purpose image and a setting screen of the camera when in the second state.

In addition, the camera of the present invention does not necessarily need to incorporate the image pickup section for photographing a view confirming image. For example, a camera which photographs a view confirming image using an external camera unit and also provides an eyepiece section with a view confirming image received from the camera unit, and a camera system including the above-described camera and camera unit are also included in a specific embodiment of the present invention.

DETAILED DESCRIPTION OF THE EMBODIMENTS

Description of First Embodiment

Hereinafter, the structure of a single lens reflex electronic camera of a first embodiment will be described with reference to the accompanying drawings.

Figure 1:
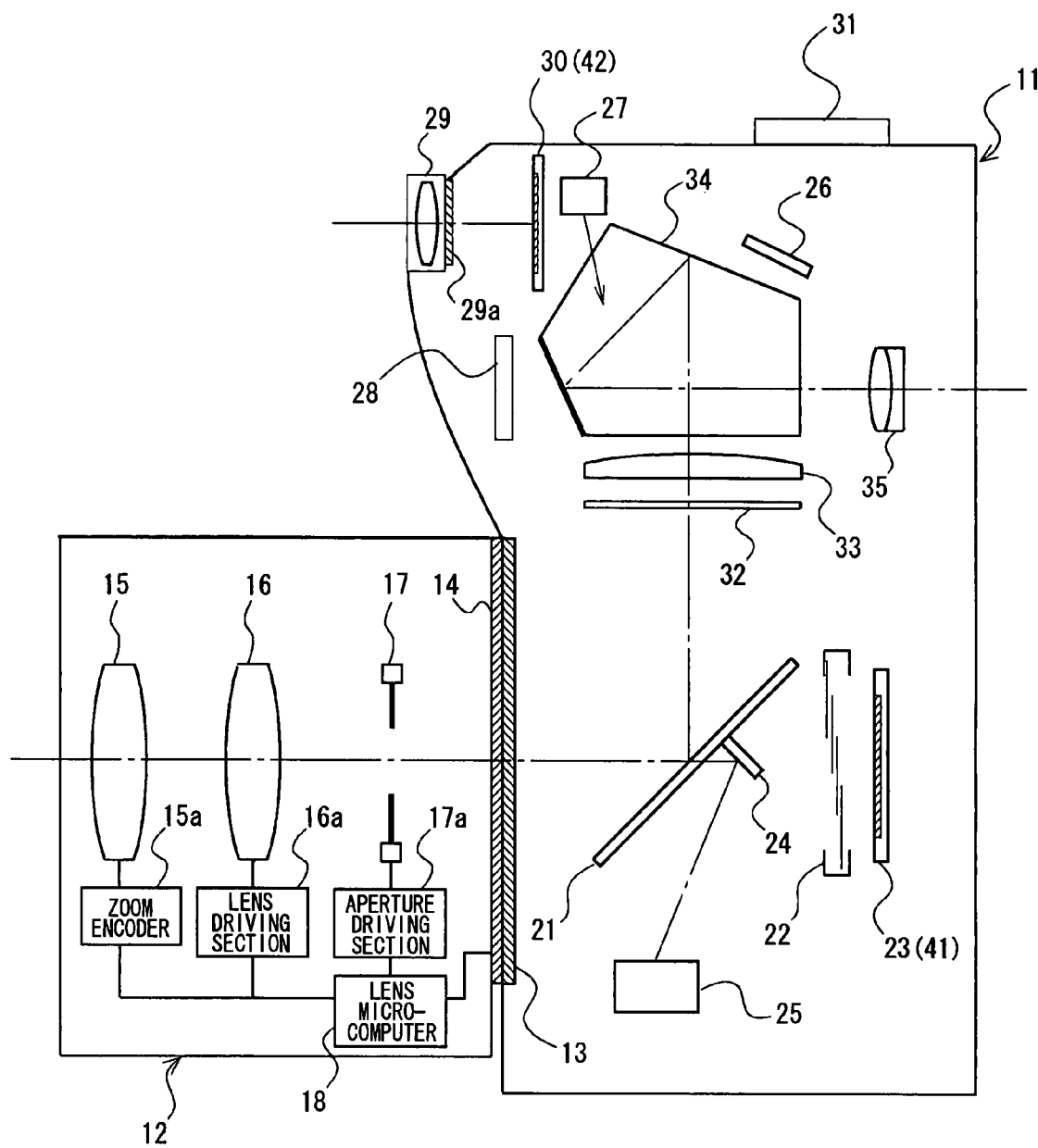
FIG. 1 is an explanatory view of a photographing mechanism of an electronic camera in a first embodiment.
Figure 2:
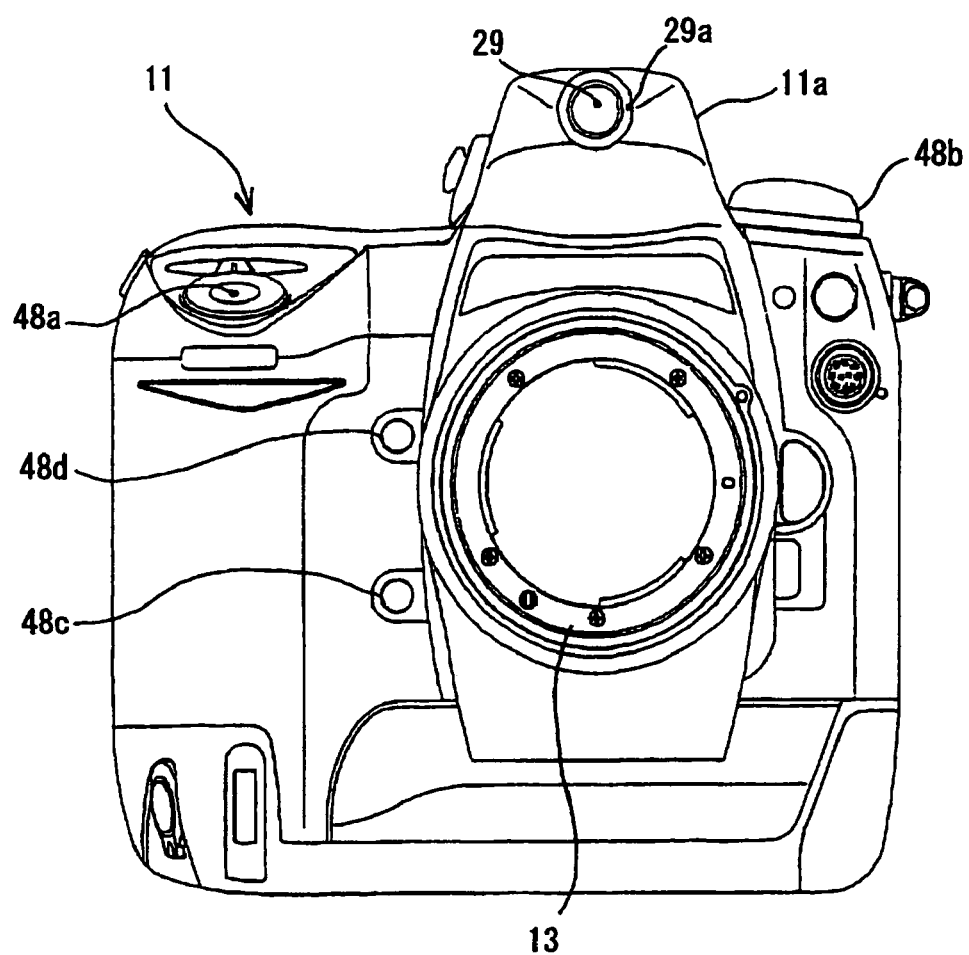
FIG. 2 is a front view of a camera body in the first embodiment.

FIG. 1 is a view illustrating a photographing mechanism of the electronic camera in the first embodiment. Moreover, FIG. 2 is a front view of a camera body in the first embodiment. The electronic camera of the first embodiment includes a camera body 11, and a lens unit 12 that houses an optical shooting system.

A pair of mounts 13, 14 serving as male and female mounts is provided in the camera body 11 and the lens unit 12, respectively. The lens side mount 14 is coupled with the camera side mount 13 by means of a bayonet mechanism or the like, whereby the lens unit 12 is interchangeably attached to the camera body 11. Moreover, electric contacts (not shown) are provided in the above-described mounts 13, 14, respectively. When the camera body 11 is connected to the lens unit 12, contact between the electric contacts results in the establishment of electrical connection between the both.

First, the structure of the lens unit 12 is described. The lens unit 12 includes a zoom lens 15, a zoom encoder 15a, a focus lens 16, a lens driving section 16a, an aperture 17, an aperture driving section 17a, and a lens microcomputer 18. In addition, the zoom encoder 15a, the lens driving section 16a, and the aperture driving section 17a are connected to the lens microcomputer 18, respectively.

The zoom lens 15 is a lens for adjusting a focal length, and is movable forward and backward in the optical axis direction in response to the operation of a zoom ring (not shown). Moreover, the zoom encoder 15a for detecting a position in the optical axis direction of the lens is attached to the zoom lens 15.

The focus lens 16 is a lens for adjusting a focus position and is movable forward and backward in the optical axis direction. The lens driving section 16a drives the focus lens 16 by a motor (not shown) and outputs a position in the optical axis direction of the focus lens 16 to the lens microcomputer 18.

The aperture 17 adjusts the amount of light incident upon the camera body 11 by opening and closing aperture blades. The aperture driving section 17a controls the opening of the aperture 17 by a motor (not shown).

The lens microcomputer 18 communicates with the camera body 11 via the electric contact of the mount 14 and carries out various controls in the lens unit 12. Moreover, the lens microcomputer 18 transmits a lens data and the like recorded on a ROM (not shown) to the camera body 11.

Incidentally, the lens unit 12 shown in FIG. 1 is just an example of the structure of a typical zoom lens unit. Thus, other than the above-described lens unit 12, for example, a lens unit without the lens microcomputer 18, a lens unit of a single focal lens, and the like can be attached to the camera body 11 of the first embodiment.

Next, the structure of the photographing mechanism of the camera body 11 is described. The camera body 11 includes a main mirror 21, a mechanical shutter 22, a first image sensor 23, a sub mirror 24, a focal point detecting section 25, a viewfinder optical system (32 to 35), a photometry section 26, a superimposing section (SI section) 27, an in-viewfinder monitor 28, an interchangeable lens 29, and a second image sensor 30.

The main mirror 21, the mechanical shutter 22, and the first image sensor 23 are disposed along the optical axis of the optical shooting system. The sub mirror 24 is disposed behind the main mirror 21. Moreover, the viewfinder optical system, the photometry section 26, the SI section 27, the in-viewfinder monitor 28, the lens 29, and the second image sensor 30 are disposed in an upper part of the camera body 11. Moreover, the focal point detecting section 25 is disposed in a lower region of the camera body 11. In addition, a hot shoe 31 for attaching a flash emission device or the like is provided in an upper part of the camera body 11.

The main mirror 21 is rotatably supported by means of a non-illustrated rotating shaft, and is switchable between an observation state and a retreated state. The main mirror 21 in the observation state is inclined and disposed in front of a mechanical shutter 22 and the first image sensor 23. The main mirror 21 in this observation state reflects a light flux passing through the optical shooting system upwards and leads the same to the viewfinder optical system. Moreover, a center part of the main mirror 21 is a half mirror. Then, a part of the light flux that is transmitted through the main mirror 21 is refracted downward by means of the sub mirror 24 and is led to the focal point detecting section 25. In addition, the focal point detecting section 25 detects an image shift amount of a subject image, the subject image being divided by a non-illustrated separator lens, for each AF area and carries out focus detection according to the so-called phase difference detecting method.

On the other hand, the main mirror 21 in the retreated state is positioned away from the photographing optical path by being flipped upward together with the sub mirror 24. When the main mirror 21 is in the retreated state, a light flux passing through the optical shooting system is led to the mechanical shutter 22 and the first image sensor 23.

The viewfinder optical system includes a diffusing screen (focal plane plate) 32, a condenser lens 33, a pentagonal prism 34, and an eyepiece lens 35. The pentagonal prism 34 among the optical elements of the viewfinder optical system is housed in a position of an overhang part 11a of the camera body 11.

The diffusing screen 32 is positioned above the main mirror 21, and a light flux reflected by the main mirror 21 in the observation state forms an image onto the diffusing screen 32 once. The light flux forming an image on the diffusing screen 32 passes through the condenser lens 33 and the pentagonal prism 34, and is led to an exit plane having an angle of 90° with respect to an incident plane of the pentagonal prism 34. Then, the light flux from the exit plane of the pentagonal prism 34 will reach a user's eye via the eyepiece lens 35. In addition, a plane opposite to the exit plane of the pentagonal prism 34 serves as a half mirror.

The photometry section 26 has a light-receiving plane in which photo detectors are disposed in two dimensions. Then, the photometry section 26 causes a part of the light flux forming an image on the diffusing screen 32 to re-form an image onto the light-receiving plane, whereby a photographing screen is divided into a plurality of portions according to a light flux passing through the optical shooting system, thus allowing photometry. In addition, the photometry section 26 is disposed in the vicinity of the pentagonal prism 34.

The SI section 27 carries out superimposing display (SI display), which superimposes the position of an AF area during photographing onto an optical image of the viewfinder optical system, by irradiating the diffusing screen 32 with an illumination light.

The in-viewfinder monitor 28 is disposed facing the half mirror plane (plane opposite to the exit plane) of the pentagonal prism 34. A view confirming image to be described below and the like are displayed on the in-viewfinder monitor 28.

The lens 29 is exposed to an exterior of the camera body 11 and is interchangeably attached to a lens fixing section 29a of the camera body 11. Moreover, the second image sensor 30 directly photographs a subject via the lens 29. The second image sensor 30 can photograph a subject from an optical path different from that in the first image sensor 23 that photographs with a light flux passing through the lens unit 12. In addition, the field angle of the lens 29 is set so as to be a wider angle than the field angle of the lens unit 12.

Moreover, the lens 29 and the second image sensor 30 of the first embodiment are housed in the overhang part 11a of the camera body 11. As shown in FIG. 2, the overhang part 11a of the camera body 11 is positioned substantially in a middle portion on the upper surface side of the camera body 11, and is formed in a shape projecting upward of the camera body 11. That is, because the positions of the lens 29 and second image sensor 30 are away from the position of the mount 13 of the camera body 11, it is less likely that the light flux from a subject is blocked by a lens-barrel of the lens unit 12 to produce shading.

Here, in the first embodiment, the following description is made assuming an example in which the lens 29 having an optical zoom function and AF function is attached to the lens fixing section 29a. In addition, because the zoom mechanism and AF mechanism in the lens 29 are basically in common with those in the lens unit 12, the duplicated description is omitted. Moreover, in FIG. 1, for simplicity of description, the lens 29 is shown as one lens.

Figure 3:
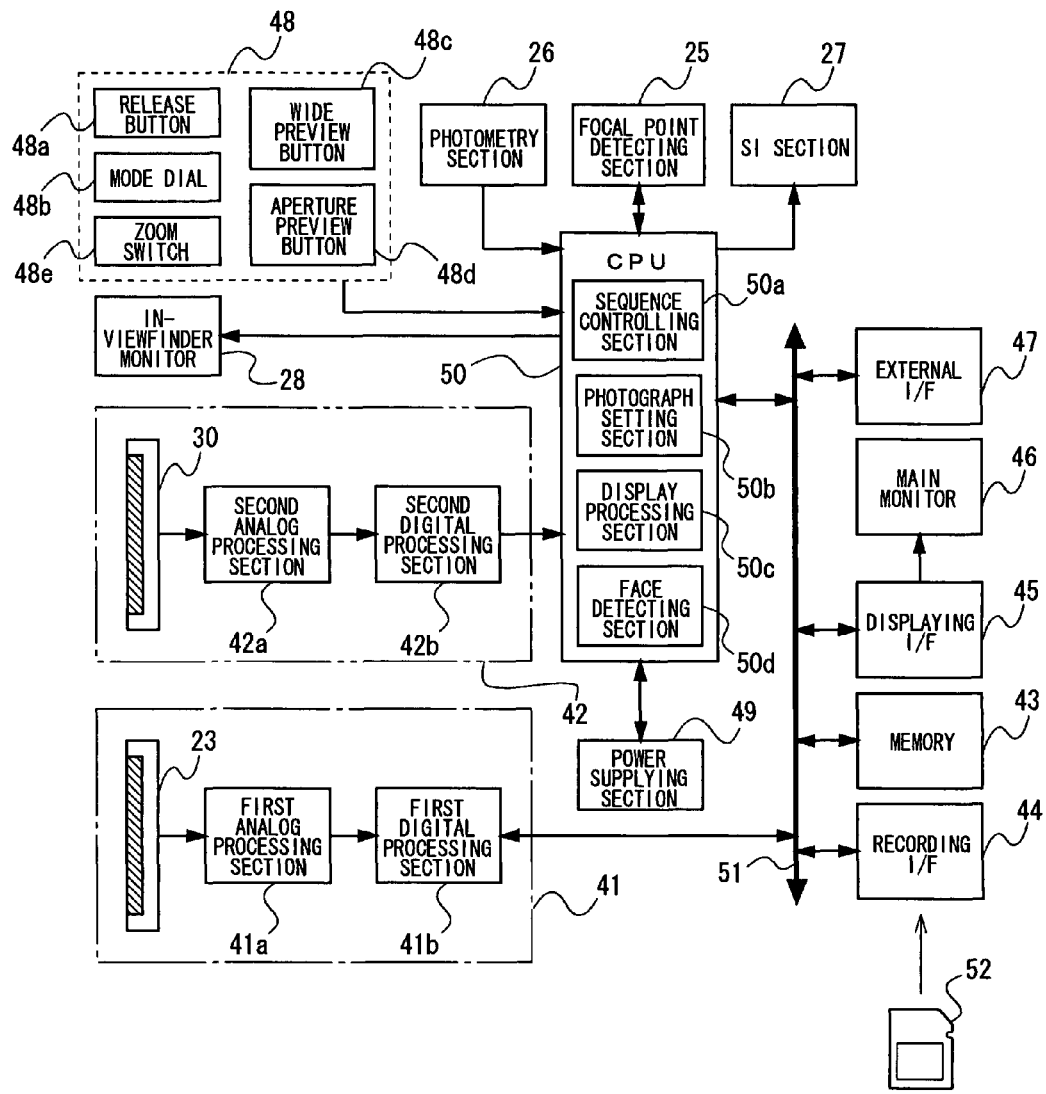
FIG. 3 is a block diagram of the camera body in the first embodiment.

Next, the circuit configuration of the electronic camera is described. FIG. 3 is a block diagram of the camera body of the first embodiment. The camera body 11 includes a first image pickup section 41, a second image pickup section 42, a memory 43, a recording I/F 44, a displaying I/F 45, a main monitor 46, an external I/F 47, an operation section 48, a power supplying section 49, and a CPU 50, and a system BUS 51, in addition to the focal point detecting section 25, the photometry section 26, the SI section 27, and the in-viewfinder monitor 28. Here, the first image pickup section 41, the memory 43, the recording I/F 44, the displaying I/F 45, the external I/F 47, and the CPU 50 are connected to one another via the system BUS 51. In addition, the CPU 50 is also connected to an electric contact of the mount 13 and an electric contact of the hot shoe 31 (illustrations thereof are omitted in FIG. 3).

The first image pickup section 41 includes the first image sensor 23, a first analog processing section 41a, and a first digital processing section 41b.

The first image sensor 23 is a sensor for generating an intended image that is a recording-purpose image. The first image sensor 23 photoelectrically converts a light flux passing through the lens unit 12 during release period and outputs an analog image signal of the intended image. An output signal of the first image sensor 23 is input to the first analog processing section 41a. In addition, the first image sensor 23 can also output a through image by pixel skipping and reading at predetermined intervals during standby for photographing (during non-release period). Thus, when the main mirror 21 is in the retreated position, the CPU 50 can also determine a photographing condition based on the through image of the first image sensor 23.

The first analog processing section 41a is an analog front end circuit that includes a CDS circuit, a gain circuit, an analog-to-digital conversion circuit, and the like. The CDS circuit reduces the noise component of an output of the first image sensor 23 by correlation double sampling. The gain circuit outputs an input signal by amplifying the input signal. This gain circuit can adjust the image pickup sensitivity that is equivalent to ISO sensitivity. The analog-to-digital conversion circuit analog-to-digital converts an output signal of the first image sensor 23. In addition, in FIG. 3, the illustration of the respective circuits of the first analog processing section 41a is omitted.

The first digital processing section 41b carries out various kinds of image processings (defective pixel correction, color interpolation processing, gray scale conversion processing, white balance adjustment, edge enhancement, and the like) to the output signal of the first analog processing section 41a to generate a data of the intended image. Moreover, the first digital processing section 41a carries out compression and expansion processing and the like of the data of the intended image. The first digital processing section 41a is connected to the system BUS 51.

The second image pickup section 42 includes the second image sensor 30, a second analog processing section 42a, and a second digital processing section 42b. In addition, because the configuration of the second image pickup section 42 substantially corresponds to the configuration of the first image pickup section 41, a part of the description regarding the duplicated portion between the both is omitted.

The second image sensor 30 photographs a view confirming image used for the viewfinder. The second image sensor 30 photoelectrically converts a subject image formed passing through the lens 29, at predetermined intervals and outputs a through image (view confirming image). An output signal of the second image sensor 30 is input to the second analog processing section 42a.

The second analog processing section 42a is an analog front end circuit that includes a CDS circuit, a gain circuit, an analog-to-digital conversion circuit, and the like. The second digital processing section 42b carries out color interpolation processing and the like of the through image. In addition, a data of the through image output from the second digital processing section 42b is input to the CPU 50.

The memory 43 is a buffer memory for temporarily recording the data of an intended image in a preceding step, a subsequent step, or the like of the image processing by the first digital processing section 41b.

A connector for connecting a recording medium 52 is formed in the recording I/F 44. Then, the recording I/F 44 carries out writing/reading of a photographic image data to/from the recording medium 52 connected to the connector. The above-described recording medium 52 is configured with a hard disk, a memory card containing a semiconductor memory, and the like. In addition, FIG. 3 illustrates a memory card as an example of the recording medium 52.

The displaying I/F 45 controls the display of the main monitor 46 based on an instruction from the CPU 50. The main monitor 46 is disposed at the back part of the camera body 11 and the like, for example. The main monitor 46 displays various kinds of images in response to instructions from the CPU 50 and displaying I/F 45. For example, the main monitor 46 can display the reproduced image of an intended image, a menu screen capable of receiving GUI (Graphical User Interface) type inputs, and the like (illustration of each of the above-described images is omitted).

The external I/F 47 includes connection terminals compliant with a serial communications standard, such as USB (Universal Serial Bus). Then, the external I/F 47 controls data transmission and reception with a computer connected via the connection terminal, according to the above-described telecommunications standard.

The operation section 48 includes a plurality of switches for accepting the operations of a user. For example, the operation section 48 includes a release button 48a, a mode dial 48b, a wide preview button 48c, an aperture preview button 48d, and a zoom switch 48e.

The release button 48a accepts an instruction input for starting an AF operation before photographing and an instruction input for starting an exposure operation during photographing, from a user. The mode dial 48b accepts an input for switching the photographing modes, from a user. The wide preview button 48c accepts from a user an operation for switching between the viewfinder display of an optical image by means of the viewfinder optical system and the display of a view confirming image (wide preview display) by means of the in-viewfinder monitor 28. The aperture preview button 48d accepts from a user a confirming input for confirming the range of depth of field. If there is this confirming input, the aperture 17 is squeezed down and a user can confirm the range of depth of field by means of the viewfinder optical system. The zoom switch 48e accepts from a user an operation for optically or electronically increasing/decreasing the magnifying power of the view confirming image.

The power supplying section 49 supplies the electric power of a non-illustrated battery to each part of the camera body 11. Moreover, the power supplying section 49 detects the remaining amount of battery based on the battery voltage.

The CPU 50 carries out an overall control of each part of the electronic camera. Moreover, the CPU 50 functions as a sequence control section 50a, a photograph setting section 50b, a display processing section 50c, and a face detecting section 50d, by means of programs stored in a non-illustrated ROM.

The sequence control section 50a carries out operation control and the like of the lens unit 12, the main mirror 21, the mechanical shutter 22, the first image pickup section 41, the second image pickup section 42, and the like. Moreover, the sequence control section 50a carries out control for switching between the finder display by means of the viewfinder optical system and the wide preview display, in response to the operation of the wide preview button 48c. In addition, the sequence control section 50a functions also as an emission control section that carries out emission control of an external flash emission device (not shown).

The photograph setting section 50b carries out an automatic exposure (AE) calculation, an auto white balance (AWB) calculation, and the like, while carrying out autofocus (AF), and determines various kinds of parameters (exposure time, aperture value, image pickup sensitivity, and the like) of the photographing condition of the first image pickup section 41. Moreover, the photograph setting section 50b is also responsible for processings regarding AF, AE, and AWB of the second image pickup section 42.

More specifically, the photograph setting section 50b calculates a defocusing amount (deviation amount from a focus position and the direction thereof) of the focus lens 16 for each AF area based on an image phase difference amount in the focal point detecting section 25. Moreover, the photograph setting section 50b carries out the AE calculation and AWB calculation based on an output of the photometry section 26. In addition, the photograph setting section 50b can also carry out each calculation of the AF, AE, and AWB based on the data of a through image of the first image sensor 23 or the second image sensor The display processing section 50c performs various kinds of image processings on the data of the through image of the second image pickup section 42. In addition, a view confirming image output from the display processing section 50c is displayed on the in-viewfinder monitor 28.

The face detecting section 50d performs the well-known face detection processing on the data of the through image of the second image pickup section 42, and detects the face area of a subject contained in the view confirming image. For example, the face detecting section 50d extracts the face area by an extraction processing of the characteristic points of a face described in Japanese Unexamined Patent Application Publication No. 2001-16573 and the like. The above-described characteristic points include each end point of the eyebrow, eye, nose, and lip, a contour point of the face, a vertex of the head, a lower end point of the jaw, and the like, for example. Or, as in Japanese Unexamined Patent Application Publication No. 8-63597, the face detecting section 50d may extract the contour of a skin-colored region based on color information on a subject, and detect the face by further performing the matching with the template of a face component that is prepared in advance.

Figure 4:
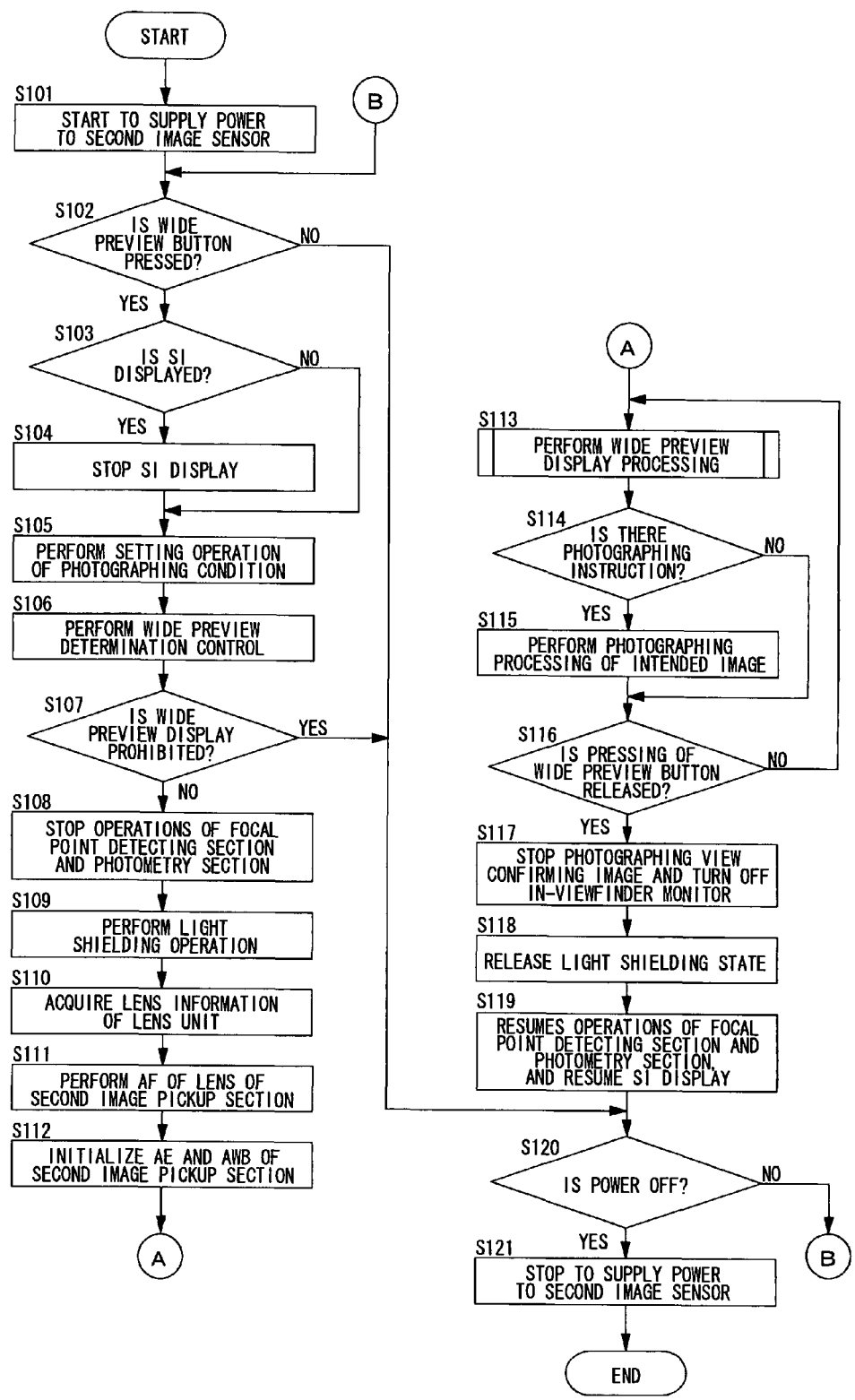
FIG. 4 is a flow chart showing the operation of the electronic camera regarding a wide preview display in the first embodiment.

Hereinafter, the operation of the electronic camera regarding the wide preview display in the first embodiment is described with reference to a flow chart of FIG. 4.

Figure 5:
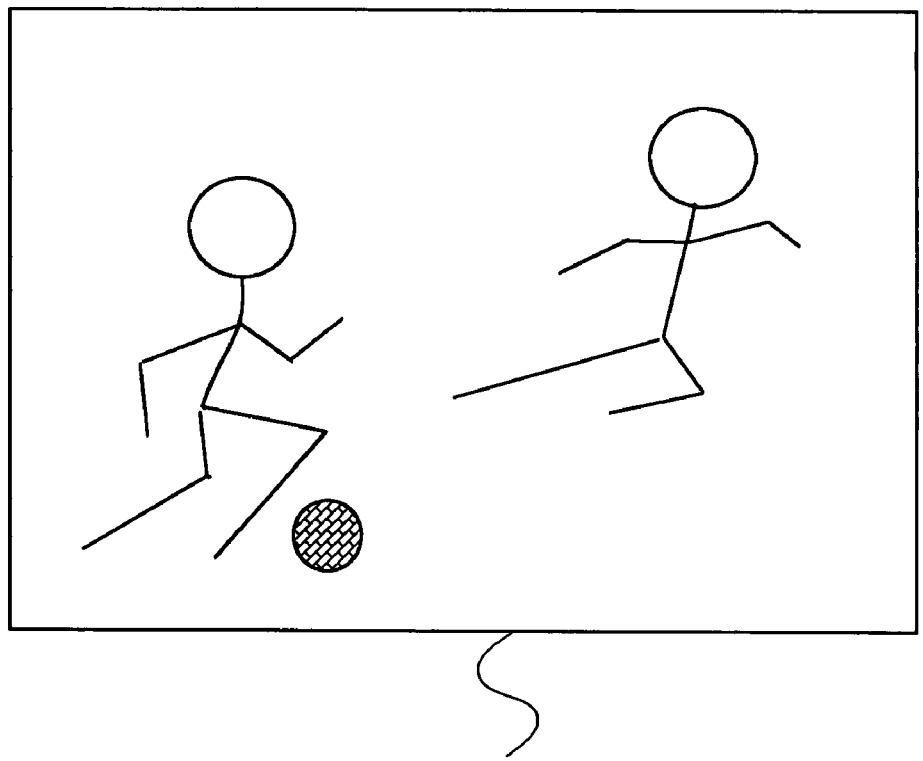
FIG. 5 is a view showing a display state of an optical image of a subject in a viewfinder optical system.

Step 101: when a user turns on the power of the camera body 11, the CPU 50 will start to supply power to the second image sensor 30. In the stage of S101, the main mirror 21 is in the observation position. Accordingly, a user can observe from the eyepiece lens 35 a subject image formed by a light flux that passed through the lens unit 12. In addition, FIG. 5 shows a display state of an optical image of a subject in the viewfinder optical system.

Step 102: the CPU 50 determines whether or not the wide preview button 48c is being pressed. If the wide preview button 48c is being pressed (YES side), the flow moves to S103. On the other hand, if the wide preview button 48c is not being pressed (NO side), the flow moves to S120.

Step 103: the CPU 50 determines whether or not the SI section 27 is performing SI display of an AF area while the wide preview button 48c is pressed. If the SI display is being performed (YES side), the flow moves to S104. On the other hand, if the SI display is not being performed (NO side), the flow moves to S105.

Step 104: the CPU 50 instructs the SI section 27 to stop the SI display. This is because an optical image by the viewfinder optical system is not displayed in the wide preview display and thus the SI display is not required.

Step 105: the CPU 50 performs a setting operation of the photographing condition. Specifically, the CPU 50 executes AF based on an output of the focal point detecting section 25. Moreover, the CPU 50 executes the AE calculation and AWB calculation based on an output of the photometry section 26. In addition, in S105, the SI display of an AF area by the SI section 27 is not performed.

Step 106: the CPU 50 executes wide preview determination control to determine whether or not it is the case where the wide preview display is prohibited.

Specifically, if the case corresponds to any of the following conditions: (1) when light emission by the flash-emission device is performed during photographing and (2) when the brightness of field is below a threshold, then the CPU 50 turns on a flag for prohibiting the wide preview display.

Step 107: the CPU 50 determines whether or not the flag for prohibiting the wide preview display has been turned on in the wide preview determining control (S106). If the wide preview display is prohibited (YES side), the flow moves to S120. On the other hand, if the wide preview display is allowed (NO side), the flow moves to S108.

Step 108: the CPU 50 stops the operations of the focal point detecting section 25 and photometry section 26 before starting the wide preview display. This is because the focal point detecting section 25 and the photometry section 26 will be unable to function by the below-described light shielding operation during wide preview display.

Step 109: the CPU 50 performs the light shielding operation to cut off the incident light from the lens unit 12 onto the viewfinder optical system.

Specifically, the CPU 50 moves the main mirror 21 from the observation position to the retreated position to cut off the incident light onto the viewfinder optical system. In addition, if the brightness of field is sufficiently low, the CPU 50 may cut off the incident light onto the viewfinder optical system by squeezing down the aperture 17.

Step 110: the CPU 50 acquires lens information (the lens positions and the like of the zoom lens 15 and the focus lens 16) from the lens unit 12.

Step 111: the CPU 50 executes AF of the lens 29 based on the lens position of the focus lens 16 among the lens information in S110. In addition, if the lens 29 is of a pan-focus type and does not have the AF function, the step of S111 is omitted.

Step 112: the CPU 50 initializes the AE and AWB of the second image pickup section 42 based on the photographing condition acquired in S105. In addition, after the start of photographing in the second image pickup section 42, the CPU 50 adjusts the parameters of the AE and AWB of the second image pickup section 42 based on the data of a through image of the second image pickup section 42.

Step 113: the CPU 50 performs wide preview display processing for displaying a view confirming image photographed by the second image pickup section 42, on an in-viewfinder monitor 28. In addition, a detailed description of the wide preview display processing will be described below using FIG. 6.

Figure 7:
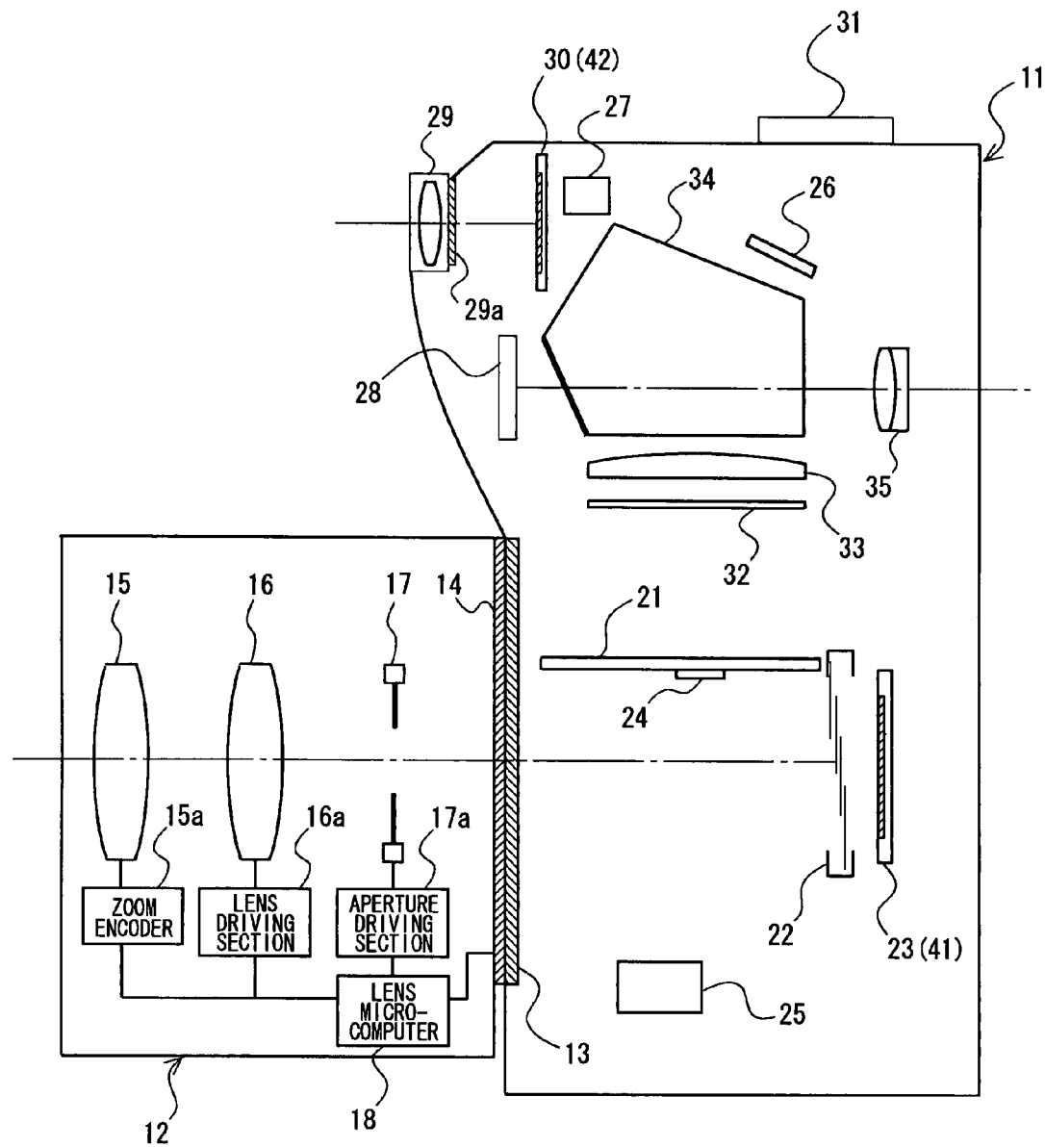
FIG. 7 is a view showing a state of the camera body during the wide preview display.

Moreover, FIG. 7 shows a state of the camera body 11 during wide preview display. Since the incident light from the lens unit 12 onto the viewfinder optical system is cut off by the light shielding operation (S109) during wide preview display, a user can observe only the view confirming image of the in-viewfinder monitor 28 from the eyepiece lens 35. Accordingly, a user can observe the field by means of a view confirming image without detaching eyes away from the eyepiece lens 35. In addition, FIG. 7 shows an example of the light shielding state in which the main mirror 21 is moved to the retreated position during the light shielding operation.

Step 114: the CPU 50 determines whether or not there is a photographing instruction by pressing of the release button 48a. If there is the photographing instruction (YES side), the flow moves to S115. On the other hand, if there is no photographing instruction (NO side), the flow moves to S117.

Step 115: the CPU 50 performs photographing processing of an intended image, and thereby photographs the intended image with the first image sensor 23 of the first image pickup section 41. Subsequently, the first image pickup section 41 generates an image data of the intended image, and the CPU 50 records the image data of the intended image onto the recording medium 52.

Here, in the photographing processing of the intended image in S115, the CPU 50 photographs the intended image based on the photographing condition in S105 while maintaining the light shielding state. For this reason, the CPU 50 can continue the wide preview display also during the photographing processing of the intended image.

Moreover, the CPU 50 may suspend the wide preview display immediately after photographing of the intended image and display an image used for display corresponding to the intended image (freeze image) onto the in-viewfinder monitor 28 for a predetermined time interval. At this time, a freeze image based on the image data of the intended image is displayed on the in-viewfinder monitor 28. A user can change the setting of on/off of the display of the above-described freeze image on a menu screen.

In addition, in the photographing processing of the intended image of S115, the CPU 50 may operate the focal point detecting section 25 and the photometry section 26 to re-set the photographing condition before photographing. Specifically, the CPU 50 operates the focal point detecting section 25 and the photometry section 26 to re-set the photographing condition before photographing while once releasing the wide preview display and the light shielding state caused by light shielding operation. Then, the CPU 50 photographs the intended image based on the photographing condition re-set immediately before photographing, and resumes the wide preview display after completion of the photographing. In this case, although it takes some time from release to photographing, an excellent intended image can be photographed with the electronic camera based on the photographing condition acquired immediately before photographing.

Step 116: the CPU 50 determines whether or not the pressing of the wide preview button 48c has been released. If the pressing of the wide preview button 48c has been released (YES side), the flow moves to S117. On the other hand, if the wide preview button 48c is being pressed (NO side), the CPU 50 returns to S113 and continues the wide preview display.

Step 117: the CPU 50 stops photographing the view confirming image in the second image pickup section 42 and turns off the in-viewfinder monitor 28.

Step 118: the CPU 50 releases the light shielding state caused by the light shielding operation. Accordingly, a user can observe again the subject image formed by the light flux that passed through the lens unit 12, from the eyepiece lens 35.

Step 119: the CPU 50 resumes the operations of the focal point detecting section 25 and the photometry section 26. Moreover, the CPU 50 instructs the SI section 27 to resume the SI display.

Step 120: the CPU 50 determines whether or not there is an operation to turn off the power of the camera body 11. If there is the above-described operation (YES side), the flow moves to S121. On the other hand, if there is no such operation (NO side), the CPU 50 returns to S102 and repeats the above-described operations.

Step 121: the CPU 50 stops to supply power to the second image sensor 30. Now, the description of the operations according to the flow chart of FIG. 4 has been completed.

Figure 6:
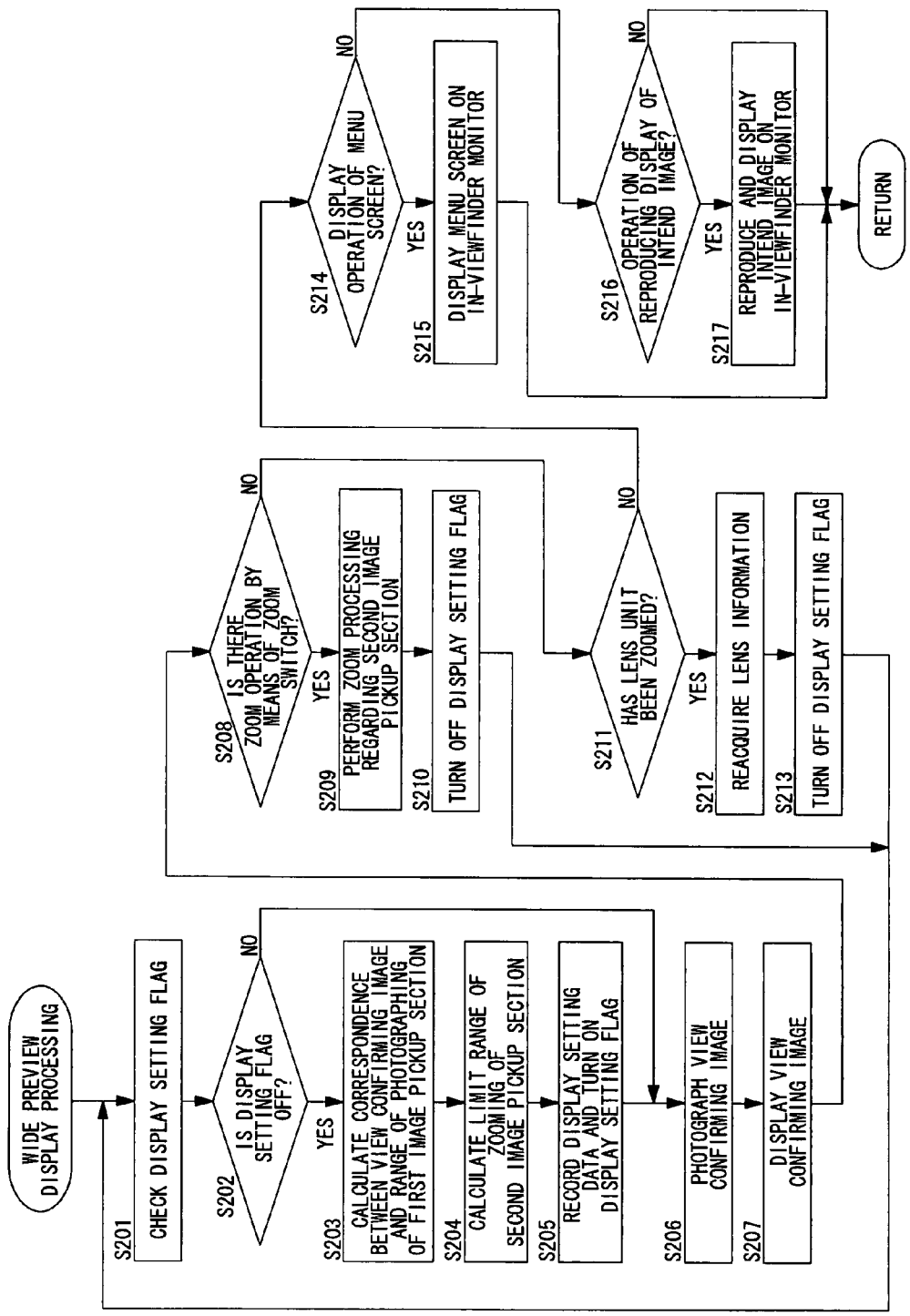
FIG. 6 is a flow chart showing an example of the wide preview display processing in FIG. 4.

Next, the above-described wide preview display processing (S113) is specifically described with reference to the flow chart of FIG. 6. In addition, in the wide preview display processing, the CPU 50 can execute the zooming of the lens 29 or the electronic zooming of a view confirming image by the display processing section 50c, in response to a user's operation of the zoom switch 48e.

Step 201: the CPU 50 checks the display setting flag regarding the display setting of the view confirming image. This display setting flag is managed by the CPU 50 and this state is recorded in the memory 43. If the last display setting can be used, the display setting flag will be turned on, and if the last display setting can not be used, the display setting flag will be turned off. In addition, before starting the wide preview display (in the initial state), the display setting flag is in the state of off.

Step 202: the CPU 50 determines whether or not the display setting flag (S201) is in the state of off. If the display setting flag is off (YES side), the flow moves to S203. On the other hand, if the display setting flag is on (NO side), the flow moves to S206. In addition, in this case the CPU 50 reads and acquires the below described display setting data from the memory 43.

Step 203: the CPU 50 calculates a correspondence between the view confirming image and the range of a field angle of the first image pickup section 41 (photographing area) based on a difference in the field angle between the first image pickup section 41 and the second image pickup section 42, and the parallax due to the subject distance.

Here, the correspondence between the view confirming image and the photographing area of the first image pickup section 41 is briefly described with reference to FIG. 8.

In the electronic camera of the first embodiment, the lens unit 12 and the lens 29 are disposed in parallel, and a deviation will occur between the optical axes of the respective lenses. Moreover, the field angle of the lens 29 is set so as to be wider than the field angle of the lens unit 12. For this reason, a difference will occur between the range of the view confirming image photographed through the lens 29 and the photographing area of the first image pickup section 41 through the lens unit 12.

The correspondence between the view confirming image and the photographing area of the first image pickup section 41 changes depending on the field angles of the lens unit 12 and lens 29 and the subject distance. As an example, a case where the lens unit 12 is zoomed to the telescopic side is described with reference to FIG. 8 (a). Here, in FIG. 8 (a), the field angle of the lens 29 is indicated by the dotted line. Moreover, the field angle of the lens unit 12 before zooming to the telescopic side is indicated by the dashed dotted line, and the field angle of the lens unit 12 after zooming to the telescopic side is indicated by the two-dot chain line. When the lens unit 12 is zoomed to the telescopic side, the field angle of the lens unit 12 after zooming to the telescopic side will be narrowed as compared with that before zooming to the telescopic side. For this reason, the photographing area of the first image pickup section 41 in the view confirming image will be relatively smaller as compared with that before the zooming.

Moreover, since the effect of parallax will increase as the subject distance becomes nearer even if the field angles of the lens unit 12 and lens 29 are fixed, the relationship between the both will change. As an example, a correspondence between the view confirming image and the photographing area of the first image pickup section 41 when the subject distances are different is described with reference to FIG. 8(b). Here, in FIG. 8(b), the field angle of the lens 29 is indicated by the dotted line. Moreover, the field angle of the lens unit 12 is indicated by the dashed dotted line.

Figure 8:
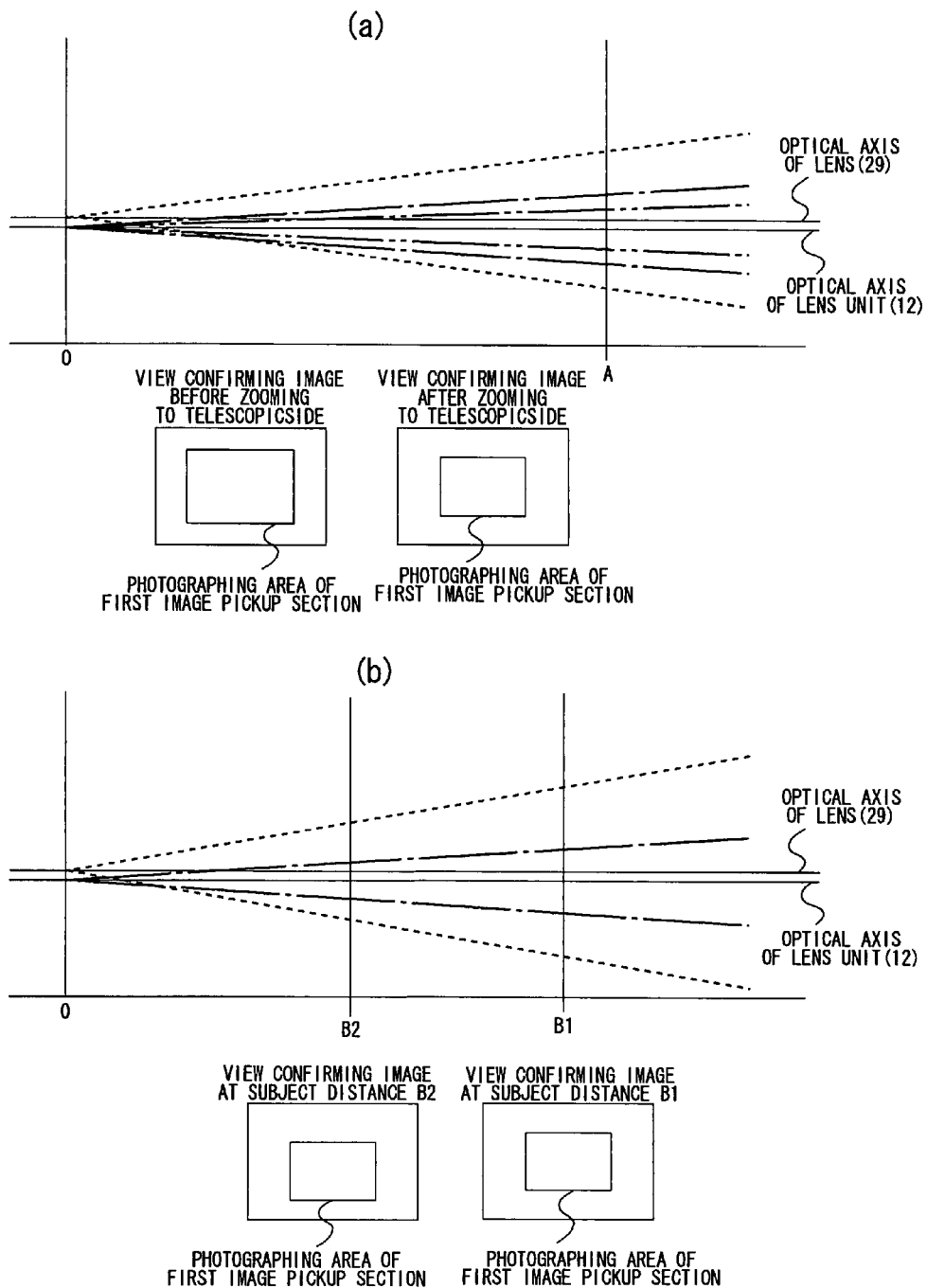
FIG. 8 is an explanatory view of a correspondence between a view confirming image and a photographing area of a first image pickup section.

In the subject distances B1 and B2 of FIG. 8 (b), if the subject is far away (B1), the amount of deviation of the optical axis is relatively small compared to the entire photographing area of the subject. For this reason, the positional deviation of the subject image between each lens is relatively small. On the other hand, if the subject is at a near position (B2), the amount of deviation of the optical axis is relatively large compared to the entire photographing area of the subject. For this reason, the deviation of the subject image between each lens is relatively large. In other words, when the subject distance is B2, the photographing area of the first image pickup section 41 in the view confirming image will shift to the lower side as compared with the case where the subject distance is B1.

For this reason, the CPU 50 executes the following calculations in S203. First, the CPU 50 calculates the subject distance from the position of the focus lens 16 of the lens unit 12 (or the position of a focus lens contained in the lens 29). Next, the CPU 50 calculates the field angles of the first image pickup section 41 and the second image pickup section 42, respectively, based on the data of the focal length of the zoom lens 15 and the data of the focal length of the lens 29. Then, the CPU 50 calculates the range of a view confirming image coinciding with the photographing area of the first image pickup section 41 based on the distance (base length) between the optical axis of the lens unit 12 and the optical axis of the lens 29, the field angles of the first image pickup section 41 and second image pickup section 42, and the subject distance.

Step 204: the CPU 50 determines the limit range of zooming regarding the second image pickup section 42 based on the calculation result of S203.

For example, if a portion coinciding with the photographing area of the first image pickup section 41 in the view confirming image is larger than an upper limit value, the CPU 50 restricts the zoom operation on the telescopic side regarding the second image pickup section 42. In other words, in the above-described case, an increase in the magnifying power of the view confirming image by means of the optical zoom of the lens 29 or the electronic zoom of the second image pickup section 42 will be restricted. This is because if the field of view of the view confirming image comes too close to the photographing area of the first image pickup section 41, a user can not observe a wide range of field and thus a benefit of the wide preview display will be lost.

On the other hand, if a portion coinciding with the photographing area of the first image pickup section 41 in the view confirming image is smaller than a lower limit value, the CPU 50 restricts the zoom operation on the wide-angle side regarding the second image pickup section 42. In other words, in the above-described case a reduction in the magnifying power of the view confirming image by means of the optical zoom of the lens 29 will be restricted. This is because if the field of view of the view confirming image is significantly large as compared with the photographing area of the first image pickup section 41a user can not know the state of field in the wide preview display.

Step 205: the CPU 50 records a data of the range of the view confirming image coinciding with the photographing area of the first image pickup section 41 (S203), and a data of the limit range (S204) of zooming regarding the second image pickup section 42, into the memory 43 as a data of the display setting of the view confirming image. Subsequently, the CPU 50 changes the display setting flag (S201) to the state of on.

Step 206: the CPU 50 photographs a view confirming image with the second image sensor 30 of the second image pickup section 42. Then, the second image pickup section 42 outputs a data of the view confirming image to the CPU 50.

Figure 9:
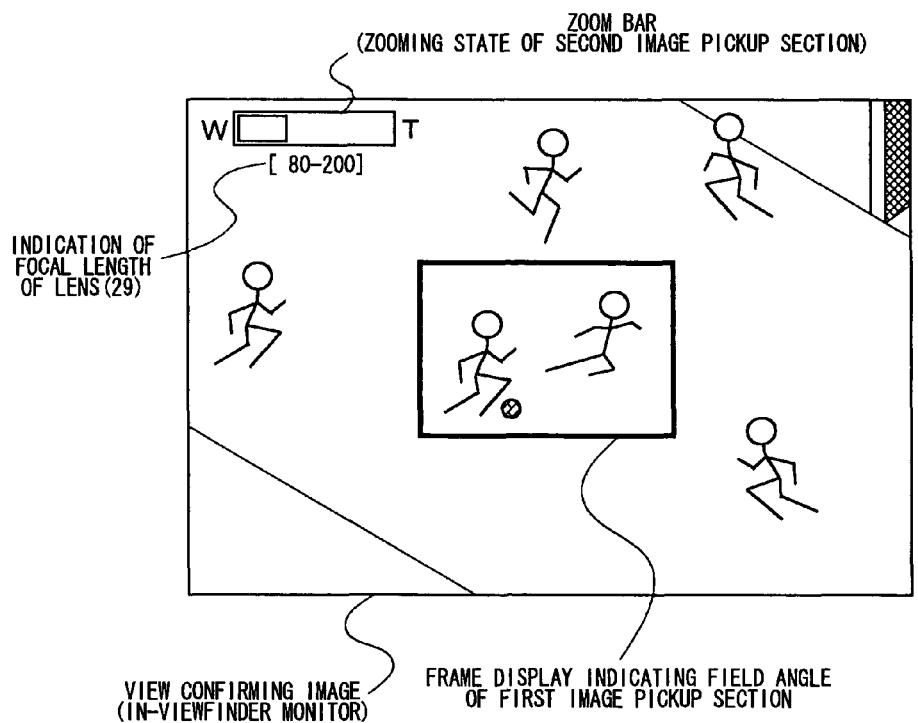
FIG. 9 is a view showing an example of a view confirming image in the wide preview display.

Step 207: the display processing section 50c of the CPU 50 causes the in-viewfinder monitor 28 to display the view confirming image. FIG. 9 shows an example of the display of the view confirming image corresponding to the scene of FIG. 5. Since the field angle of the lens 29 has a wider angle than the field angle of the lens unit 12, the view confirming image can display the subject in a wider range than an optical image of the viewfinder optical system can. In addition, in S207, the display processing section 50c performs the following display processings: (1) to (3).

(1) The display processing section 50c overlappingly displays a frame indicative of a range of the field angle of the first image pickup section 41 (photographing area) onto a view confirming image by means of an on-screen function (see FIG. 9). Here, the display processing section 50c performs the above-described frame display based on a data of the range of the view confirming image coinciding with the photographing area of the first image pickup section 41 (S203). This allows a user to know clearly the photographing area of the first image pickup section 41 even during wide preview display. In addition, in the first embodiment, the display processing section 50c makes adjustment by changing the size and position of the frame with respect to a view confirming image in the case where the zooming state or the like changes (see FIG. 10 and FIG. 11).

(2) The display processing section 50c overlappingly displays an indication of a numerical value of the focal length of the lens 29 onto a view confirming image by means of an on-screen function (see FIG. 9). This allows a user to know, on the view confirming image, what type of lens 29 is mounted.

(3) The display processing section 50c overlappingly displays a zoom bar onto a view confirming image by means of an on-screen function (see FIG. 9). This zoom bar indicates a limit range of zooming regarding the second image pickup section 42 (S204) and the current zooming state of the second image pickup section 42. This allows a user to easily know to what extent the magnifying power of the view confirming image can be changed using the zoom switch 48e.

Especially when the current zooming state is at a telescopic edge or at a wide-angle edge in the limit range, the indication of the zoom bar allows a user to know that the zoom operation on the telescopic side or on the wide-angle side is not allowed. Thus, the indication of the zoom bar also functions as a warning indicator when the zoom operation on the telescopic side or on the wide-angle side by means of the zoom switch 48e is restricted. In addition, when the zoom operation by means of the zoom switch 48e is restricted, the display processing section 50c may further display on the in-viewfinder monitor 28 a warning indicator different from the zoom bar (illustration of the warning indicator in this case is omitted).

Step 208: the CPU 50 determines whether or not there is an effective zoom operation by means of the zoom switch 48e. Here, when the current zooming state is at the telescopic edge or at the wide-angle edge in the limit range, the CPU 50 will cancel the zoom operation outside the limit range as an invalid operation. If there is the above-described effective zoom operation (YES side), the flow moves to S209. On the other hand, if there is no above-described effective zoom operation (NO side), the flow moves to S211.

Step 209: the CPU 50 performs zoom processing regarding the second image pickup section 42 in response to an input from the zoom switch 48e. For example, the CPU 50 executes optical zoom by adjusting the lens position of the lens 29. Alternatively, the display processing section 50c of the CPU 50 executes electronic zoom by changing the setting of resolution of the view confirming image.

Step 210: the CPU 50 changes the display setting flag to the off-state and returns to S201. Then, before photographing the next frame in the second image pickup section 42, the CPU 50 will change the display setting of the view confirming image again (S202 to S205). Accordingly, in the next frame of the view confirming image, the display processing section 50c can execute the frame display reflecting the zoom processing (S209) regarding the second image pickup section 42.

Figure 10:
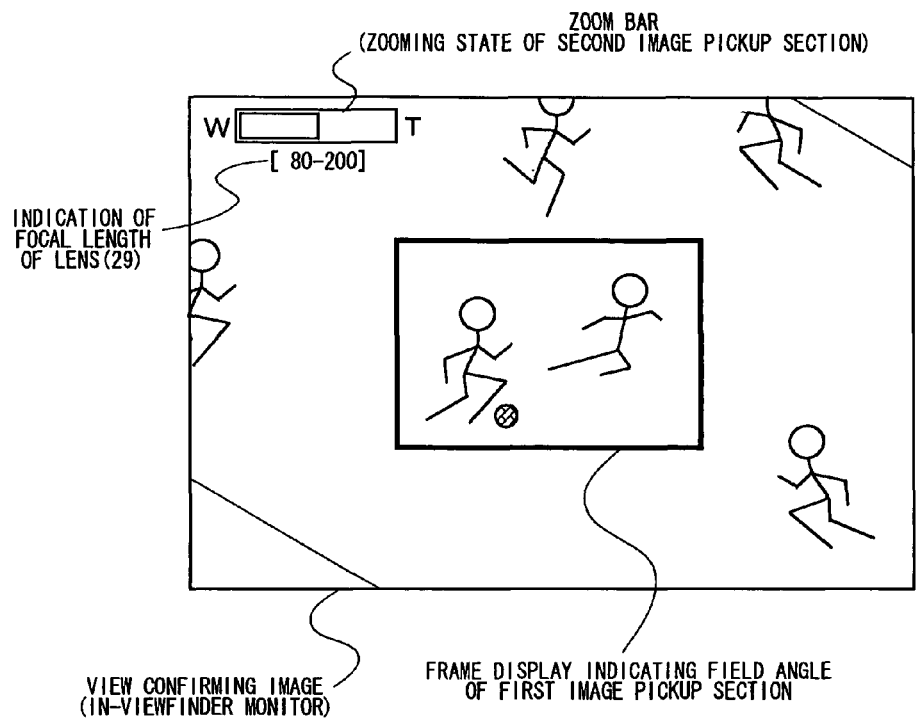
FIG. 10 is a view showing a display state of a view confirming image when zooming the scene of FIG. 9 to a telescopic side.
Figure 11:
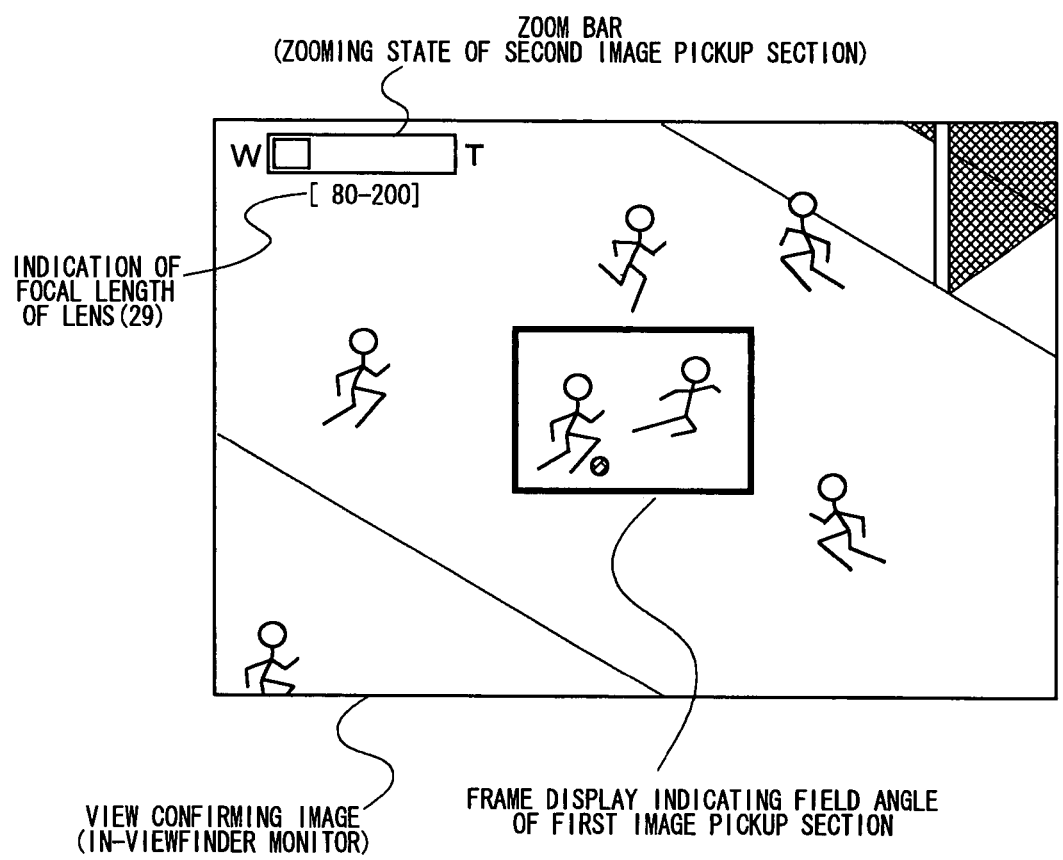
FIG. 11 is a view showing a display state of a view confirming image when zooming the scene of FIG. 9 to a wide-angle side.

Specifically, in conjunction with zooming of the view confirming image by means of the zoom switch 48e, the display processing section 50 changes the size of the frame indicative of the photographing area of the first image pickup section 41. Then, the display processing section 50 shifts the position of the frame display vertically according to the magnitude of parallax. Here, a display state of the view confirming image when the scene of FIG. 9 is zoomed to the telescopic side is shown in FIG. 10. Moreover, a display state of the view confirming image when the scene of FIG. 9 is zoomed to the wide-angle side is shown in FIG. 11.

Here, the display processing section 50c may fix the frame display to a predetermined position by partially cutting out the view confirming image and displaying the same on the in-viewfinder monitor 28. For example, the display processing section 50c shifts the cut-out position of the view confirming image corresponding to the magnitude of parallax, thereby fixing the position of a frame displayed on the in-viewfinder monitor 28 to the center. Accordingly, a user can always easily know the photographing area of the first image pickup section 41 during wide preview display.

Step 211: the CPU 50 determines whether or not there is a change in the lens position of the zoom lens 15 of the lens unit 12 (whether the lens unit 12 has been zoomed). If the lens unit 12 has been zoomed (YES side), the flow moves to S212. On the other hand, if the lens unit 12 has not been zoomed (NO side), the flow moves to S214.

Step 212: the CPU 50 re-acquires the lens information regarding the lens position of the zoom lens 15 from the lens unit 12.

Step 213: the CPU 50 changes the display setting flag to the off-state and returns to S201. Then, before photographing the next frame in the second image pickup section 42, the CPU 50 changes the display setting of the view confirming image again (S202 to S205). Accordingly, in the next frame of the view confirming image, as in the above-described S210 the display processing section 50c can execute the frame display that reflects zooming of the lens unit 12. In addition, in this case, while the field of view of the view confirming image is the same as that of the previous frame, the size and position of the frame display will change in the next frame (illustration of the view confirming image in this case is omitted).

Step 214: the CPU 50 determines whether or not a displaying operation of the menu screen has been received from a user via the operation section 48. If a displaying operation of the menu screen has been received (YES side), the flow moves to S215. On the other hand, if there is no displaying operation of the menu screen (NO side), the flow moves to S216.

Step 215: the CPU 50 suspends displaying of the view confirming image and displays a menu screen on the in-viewfinder monitor 28. Accordingly, a user can perform a setting operation on the menu screen without detaching eyes away from the eyepiece section during wide preview display. In addition, after completion of the operation on the menu screen, the CPU 50 returns to S114.

Step 216: the CPU 50 determines whether or not an operation for a reproducing display of the intended image has been accepted from a user via the operation section 48. If the operation for the reproducing display has been accepted (YES side), the flow moves to S217. On the other hand, if there is no operation for the reproducing display (NO side), the CPU 50 returns to S114.

Step 217: the CPU 50 suspends displaying of the view confirming image and executes the reproducing display of the intended image. This allows a user to view the photographed intended image without detaching eyes away from the eyepiece section during wide preview display. In addition, after completion of the reproducing display of the intended image, the CPU 50 returns to S114. Now, the description of the operations according to the flow chart of FIG. 6 has been completed.

Hereinafter, an effect of the first embodiment is described. The electronic camera of the first embodiment photographs a view confirming image from an optical path different from that of the first photographing section 41 by means of the second photographing section 42 and at the same time displays the view confirming image observably from the eyepiece lens 35 by means of the in-viewfinder monitor 28. Thus, depending on state, a user can selectively observe an optical image by means of the viewfinder optical system and a view confirming image by means of the second image pickup section 42 without detaching eyes away from the eyepiece lens 35.

Especially when a telescopic lens with a narrow field angle is mounted on the camera body 11, the field of view of an optical image by means of the viewfinder optical system becomes narrow, however, even in this case a user can appropriately know the state of field by the wide-angle view confirming image. Accordingly, even in the case where a moving subject is telescopically photographed, e.g., in photographing sports and the like, a user can track the subject relatively easily, so that the user is less likely to miss photo opportunity.

Moreover, in the first embodiment, a user can adjust the range of field, which can be confirmed with a view confirming image, by zooming of the lens 29 and electronic zooming of the view confirming image. It is therefore possible to provide a user with a view confirming image appropriate to a scene to be photographed. Especially when the lens 29 is a zoom lens and the view confirming image is optically zoomed, it is possible to provide a user with a clear image as compared with the one in the case of electronic zoom.

Moreover, according to the electronic camera of the first embodiment, a photographing area of the first image pickup section 41 is indicated as a frame display in a view confirming image (S207). Accordingly, during wide preview display, a user can observe the state of field by a view confirming image while knowing a range which the first image pickup section 41 can photograph.

Modification of First Embodiment

In the first embodiment, an example has been described, in which the display processing section 50c makes adjustment by changing the size and position of the frame with respect to a view confirming image when the zooming state or the like changes. However, the display processing section 50 may fix the size of the frame with respect to a view confirming image to thereby perform the above-described frame display (S207) in the following manner: from (1) to (4).

(1) Firstly, a case is described, in which a user zooms the lens unit 12 to the wide-angle side. In this case, the display processing section 50c performs geometric conversion processing to the data of a view confirming image and thus adjusts the size of the frame by stretching the view confirming image outwards and distorting the same.

(2) Secondly, a case is described, in which a user zooms the lens unit 12 to the telescopic side. In this case, the display processing section 50c performs electronic zooming to the data of a view confirming image and thus adjusts the size of the frame by expanding the view confirming image in accordance with the zooming of the lens unit 12.

(3) Thirdly, a case is described, in which a user zooms a view confirming image to the wide-angle side by means of the zoom switch 48e. In this case, the display processing section 50c performs geometric conversion processing to the data of a view confirming image and thus distorts the view confirming image so as to be compressed inwards. Thus, it is possible to make the size of the frame on the in-viewfinder monitor 28 the same before and after zooming while extending the field of view that is displayed on the in-viewfinder monitor 28.

(4) Fourthly, a case is described, in which a user zooms the view confirming image to the telescopic side by means of the zoom switch 48e. In this case, the display processing section 50c performs geometric conversion processing to the data of a view confirming image and thus stretches the view confirming image outwards and distorts the same. Thus, it is possible to make the size of the frame on the in-viewfinder monitor 28 the same before and after zoom while narrowing the field of view that is displayed on the in-viewfinder monitor 28.

Figure 12:
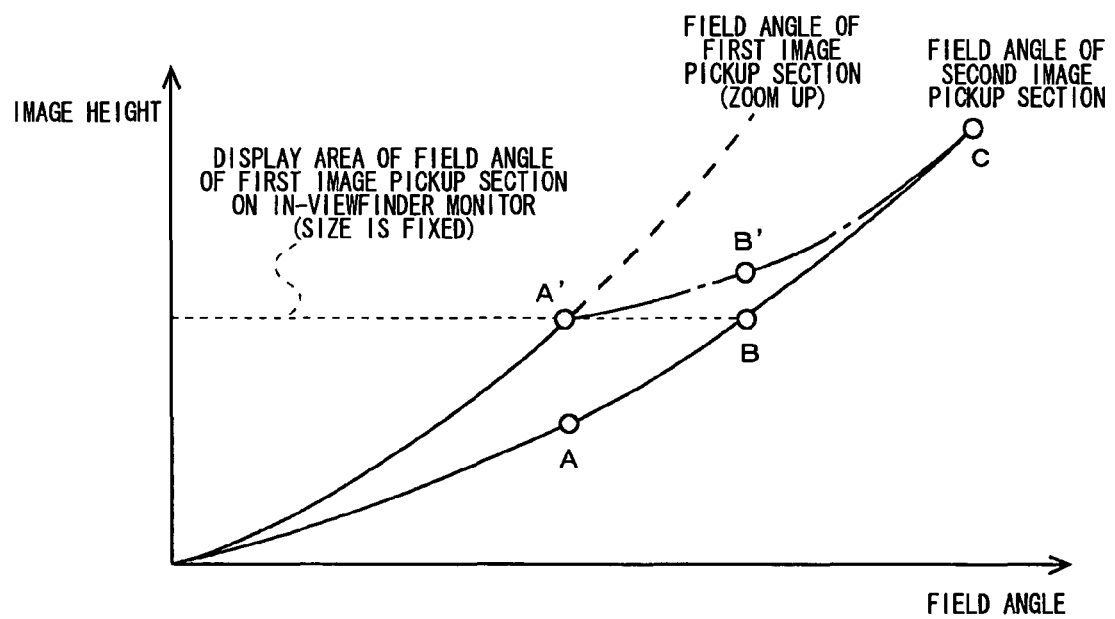
FIG. 12 is an explanatory view showing a display area when distorting a view confirming image.

In addition, in the above-described case, even if the size of a range corresponding to the field angle of the first image pickup section 41 is fixed on the in-viewfinder monitor 28, it is possible to display a subject without discontinuity regardless of the zooming state of the first image pickup section 41. As an example, with reference to FIG. 12, consider the case where the size of a range corresponding to the field angle of the first image pickup section 41 is fixed on the in-viewfinder monitor 28 while zooming up the first image pickup section 41. Before zooming in the first image pickup section 41, the subject from a point A to a point C is displayed continuously in the view confirming image of the in-viewfinder monitor 28. Here, if the view confirming image on the in-viewfinder monitor 28 is partially digital-zoomed in conjunction with zoom-up in the first image pickup section 41, the view confirming image on the in-viewfinder monitor 28 will change as follows. First, within the range of the field angle of the first image pickup section 41, the view confirming image is zoomed to be displayed only to the range of a point A'. On the other hand, if the view confirming image is displayed as it is outside the range of the field angle of the first image pickup section 41, the view confirming image in the range from the point B to the point C is displayed, and in this case, the subject in the interval from the point A to the point B will be discontinuously displayed. However, if an image is distorted outside the field angle of the first image pickup section 41 as shown by a dashed dotted line in FIG. 12, the point A' to the point C can be connected and displayed, so that the subject can be displayed continuously without discontinuing the image at a boundary of the field angle of the first image pickup section 41.

Description of Second Embodiment

Figure 13:
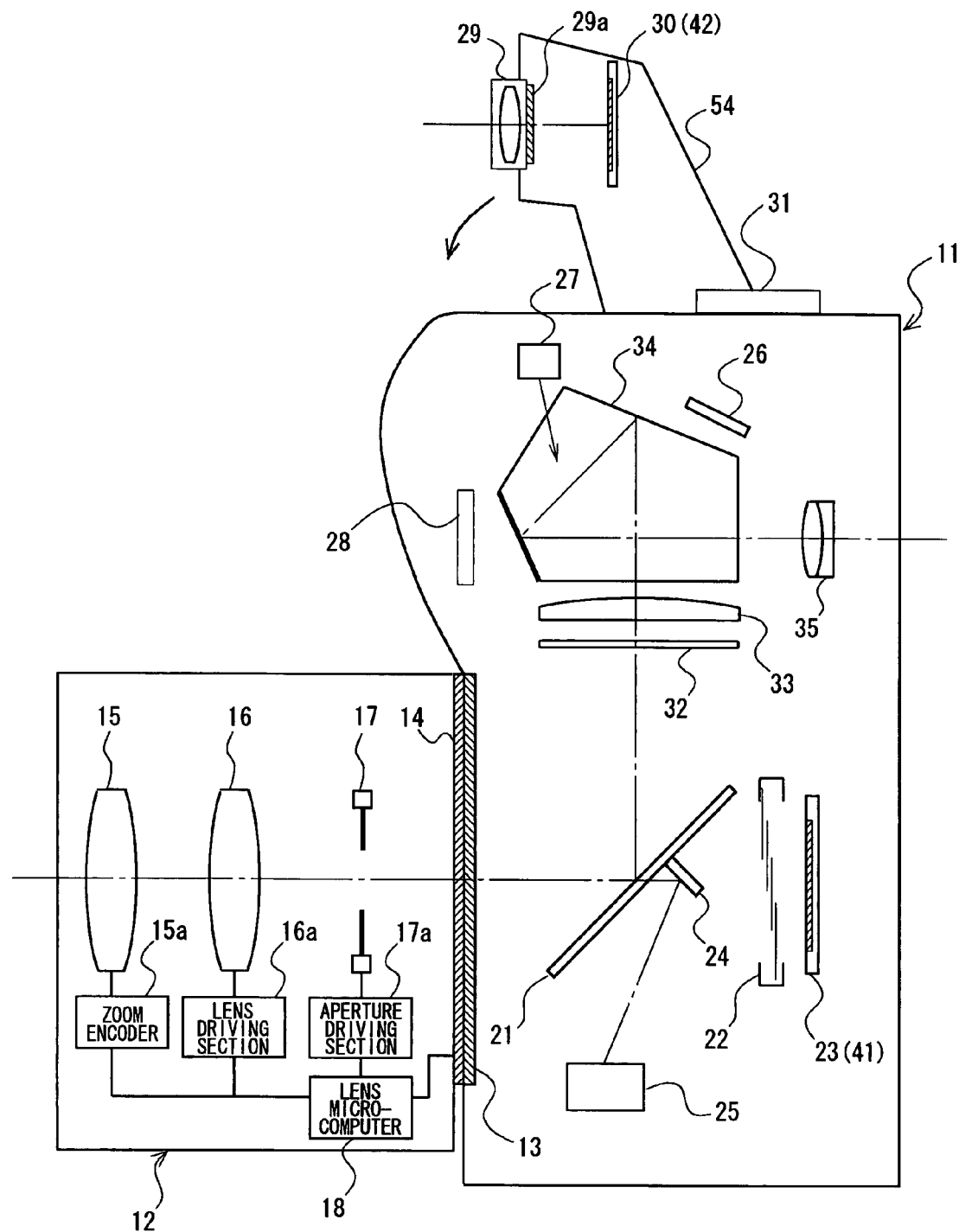
FIG. 13 is an explanatory view of a photographing mechanism of an electronic camera in a second embodiment.

FIG. 13 is a view illustrating the photographing mechanism of an electronic camera in a second embodiment. Here, in the following description of the embodiments, constituent elements of the camera are in common with those of the first embodiment and are given the same reference numerals to omit the duplicated description.

The second embodiment is a variation of the first embodiment, showing an example in which the second image pickup section 42 is attached to a movable member 54 that houses an emitting section 53 used for flash photographing. A base side of the movable member 54 is rotatably supported to the camera body 11 with a rotating shaft (not shown). Then, the movable member 54 can rotate with respect to the camera body 11 to thereby switch between a first position and a second position.

Figure 14:
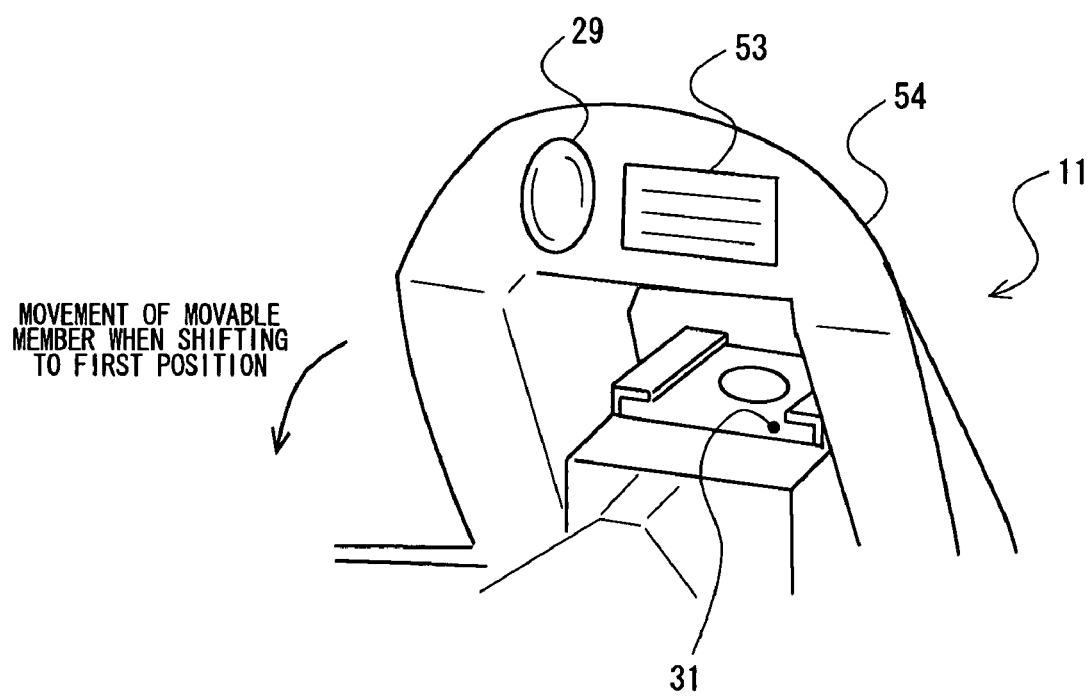
FIG. 14 is a perspective view showing a state where a movable member is in a second position.

When the movable member 54 is in the first position, the movable member 54 is housed in the camera body 11 and the movable member 54 configures a part of the surface of the camera body 11. On the other hand, when the movable member 54 is in the second position, a tip side of the movable member 54, to which the second image pickup section 42 and the emitting section 53 are attached; projects from the camera body 11 (see FIG. 14). Thus, when the movable member 54 is in the second position, the irradiation of a subject with emission of the emitting section 53 and the photographing of a view confirming image by means of the second image pickup section 42 are enabled. Here, the emitting section 53 and the lens 29 of the second image pickup section 42 are disposed side by side on the tip side of the movable member 54.

In the second embodiment described above, in addition to substantially the same effect as that of the first embodiment, the photographing position of the second image pickup section 42 can be far away from the optical axis of the lens unit 12. It is therefore possible to reduce the possibility of shading of a view confirming image by a lens-barrel of the lens unit 12, as compared with the case of the first embodiment. Moreover, in the second embodiment, because the second image pickup section 42 can be housed in the camera body 11 when not in use by moving the movable member 54, sense of design and functionality of the camera body 11 can be enhanced.

Description of Third Embodiment

Figure 15:
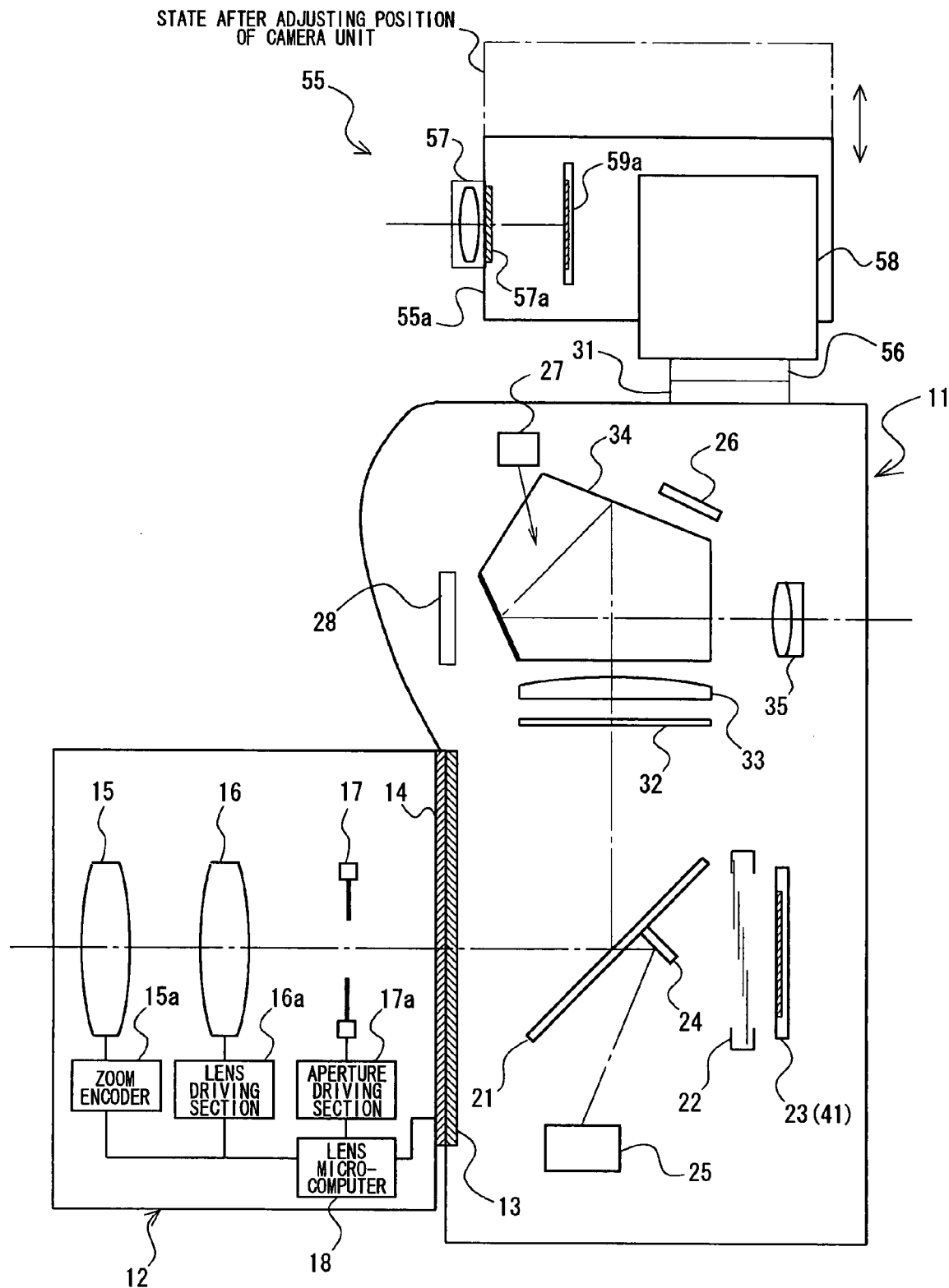
FIG. 15 is an explanatory view of a photographing mechanism of an electronic camera system in a third embodiment.
Figure 16:
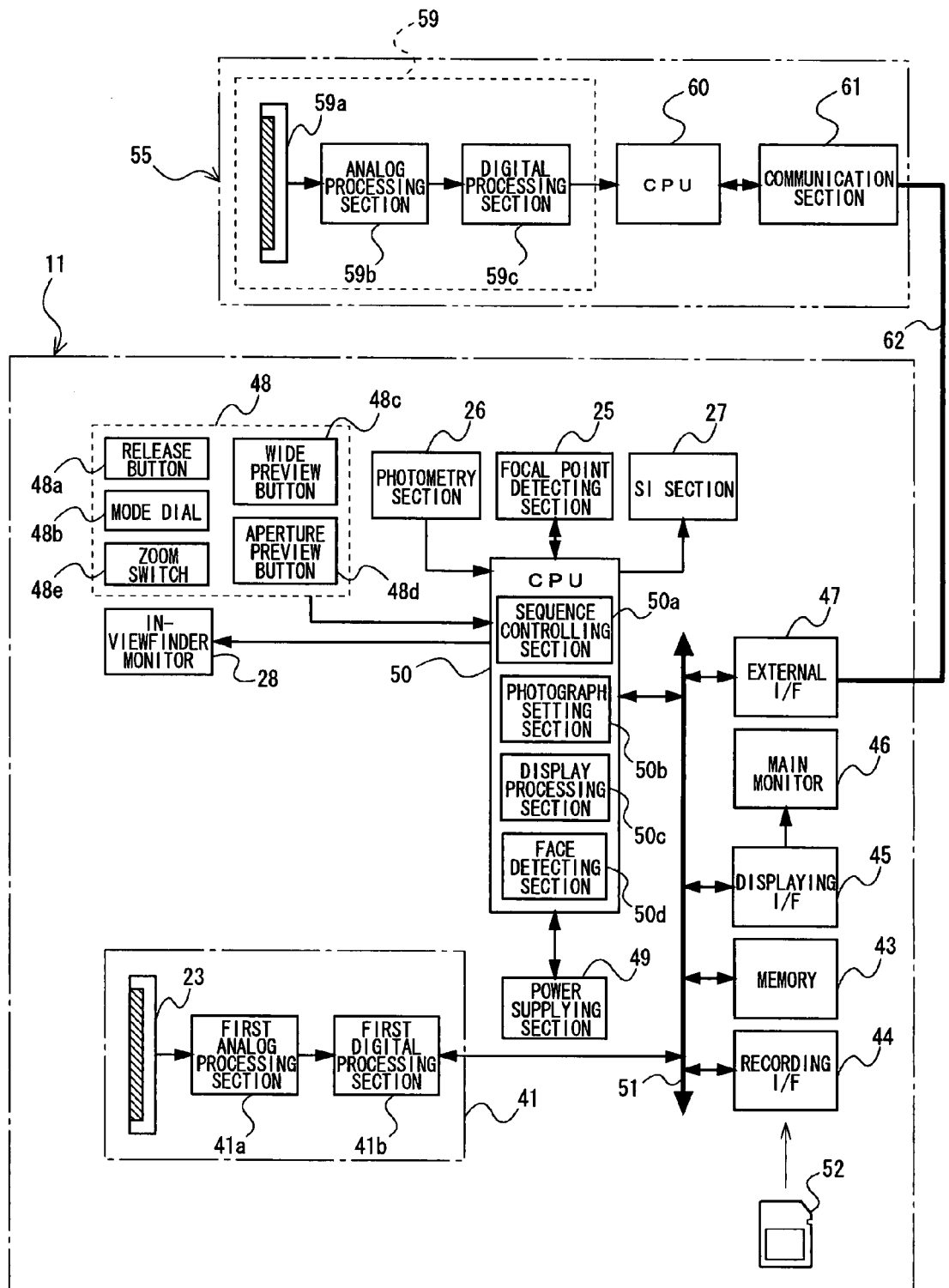
FIG. 16 is a block diagram of the electronic camera system in the third embodiment.

FIG. 15 is a view illustrating the photographing mechanism of an electronic camera in a third embodiment. Moreover, FIG. 16 is a block diagram of an electronic camera system in the third embodiment. The third embodiment shows an example in which the camera system is configured by externally attaching a camera unit 55, which photographs a view confirming image, to the camera body 11.

The camera system of the third embodiment includes the camera body 11 and the camera unit 55. The camera body 11 in the third embodiment has a configuration substantially common with that of the camera body 11 of the first embodiment, except for not including the lens fixing section 29a and the second image pickup section 42. The camera body 11 carries out communication with the camera unit 55 via the external I/F 47. In addition, in the third embodiment, the camera unit 55 is mounted in the hot shoe 31 of the camera body 11.

On the other hand, as shown in FIG. 15, the camera unit 55 includes a fixing section 56 for engaging with the hot shoe 31, a lens 57 and a lens fixing section 57a, and a position adjusting section 58. The lens 57 and the lens fixing section 57a are mounted on a body part 55a of the camera unit 55. Moreover, the lens 57 is detachable to the lens fixing section 57a, and various kinds of interchangeable lenses can be attached to the lens fixing section 57a. In addition, the configuration of the above-described lens 57 and lens fixing section 57a is substantially in common with the configuration of the lens 29 and lens fixing section 29a of the first embodiment.

The position adjusting section 58 is a pedestal-shaped member having the fixing section 56 on its bottom face section, and supports the body part 55a of the camera unit 55 slidably in the height direction (vertical direction in the view) of the camera system. The position adjusting section 58 serves for adjusting a distance from the optical axis of the lens 57 of the camera unit 55 to the fixing section 56. Thus, even if the camera unit 55 is attached to the camera body 11 of a different model, the parallax of the camera unit 55 can be adjusted by adjusting the distance between the optical axis of the optical shooting system and the optical axis of the lens 57 by means of the position adjusting section 58, so that the compatibility of the camera unit 55 can be increased. Moreover, due to the adjustment of the position of the optical axis of the lens 57 by a user by means of the position adjusting section 58, it is also possible to prevent the shading of a view confirming image caused by the lens-barrel of the lens unit 12.

Moreover, as shown in FIG. 16, the camera unit 55 includes an image pickup section 59, a CPU 60, and a communication section 61. The image pickup section 59 includes an image sensor 59a, an analog processing section 59b, and a digital processing section 59c. The image sensor 59a photoelectrically converts a subject image formed passing through the lens 57, at predetermined intervals and outputs a through image (view confirming image). The output signal of the image sensor 59a is input to the analog processing section 59b. The analog processing section 59b is an analog front end circuit that includes a CDS circuit, a gain circuit, an analog-to-digital conversion circuit, and the like. The digital processing section 59c performs color interpolation processing and the like of the through image.

The CPU 60 controls each part of the camera unit 55 based on instructions from the camera body 11.

The communication section 61 is connected to the external I/F 47 via a cable 62. The communication section 61 transmits data of a view confirming image to the camera body 11 while receiving an instruction from the camera body 11.

The operation of a wide preview display by the camera system of the third embodiment is substantially in common with that in the case of the first embodiment except that the camera unit 55 carries out the operation of the second image pickup section 42, so the detailed description is omitted.

Also with the camera system of the third embodiment described above, substantially the same effect as that of the first embodiment can be obtained.

(Supplementary Notes on Embodiments)

In the above-described embodiments, an example regarding a single lens reflex electronic camera has been mainly described, however, the present invention can be also applied to a film-based camera that photographs an intended image by exposing a subject image onto a film. Moreover, in the above-described embodiments, the lenses 29, 57 for photographing a view confirming image may be non-interchangeable with respect to the camera body 11 or the camera unit 55.

The many features and advantages of the embodiments are apparent from the detailed specification and, thus, it is intended by the appended claimed to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is ciaimed is:

1. A camera comprising:
    a first image pickup section photographing a recording-purpose image;
    a viewfinder optical system including an eyepiece section capable of observing an optical image of a subject with a light flux from a photographing optical path of said first image pickup section;
    a second image pickup section photographing a view confirming image from an optical path different from that of said first image pickup section;
    a mounting section capable of mounting and dismounting an interchangeable lens, and acquiring focal-length information of said interchangeable lens;
    a display processing section executing display processing that superimposes a frame indicating a range of a field angle of said first image pickup section, onto said view confirming image;
    a displaying section providing said eyepiece section with said view confirming image having been processed with said display processing; and
    a controlling section switching between a first state to provide said eyepiece section with said optical image and a second state to provide said eyepiece section with said view confirming image, wherein
    said displaying section changes a size of said frame based on said focal-length information when in said second state.

2. The camera according to claim 1, further comprising
a zooming section adjusting a display area of said view confirming image by one of optically and electronically changing a magnifying power of said second image pickup section.

3. The camera according to claim 2, wherein
said displaying section performs a warning indication indicative of a limit of the variable range of a magnifying power on one of a telescopic side and a wide-angle side of said zooming section, based on said focal-length information.

4. The camera according to claim 1, wherein
said display processing section adjusts a display area by distorting said view confirming image by image processing.

5. The camera according to claim 1, wherein
said display processing section executes display processing that superimposes an indication indicative of a focal length of said second image pickup section onto said view confirming image.

6. The camera according to claim 1, further comprising
a calculating section calculating parallax between said first image pickup section and said second image pickup section based on said focal-length information, wherein
said display processing section electronically corrects a position of said frame with respect to said view confirming image based on a data of said parallax.

7. The camera according to claim 1, further comprising
a calculating section calculating parallax between said first image pickup section and said second image pickup section based on said focal-length information, wherein
said display processing section electronically corrects a display area of said view confirming image based on a data of said parallax.

8. The camera according to claim 1, wherein
said second image pickup section is configured with an external camera unit capable of mounting and dismounting to the camera body.

9. A camera comprising:
a first image pickup section photographing a recording-purpose image;
a viewfinder optical system including an eyepiece section capable of observing an optical image of a subject with a light flux from a photographing optical path of said first image pickup section;
a second image pickup section photographing a view confirming image from an optical path different from that of said first image pickup section;
a mounting section capable of mounting and dismounting an interchangeable lens, and acquiring focal-length information of said interchangeable lens;
a display processing section executing display processing that superimposes a frame indicating a range of a field angle of said first image pickup section, onto said view confirming image;
a displaying section providing said eyepiece section with said view confirming image having been processed with said display processing; and
a controlling section switching between a first state to provide said eyepiece section with said optical image and a second state to provide said eyepiece section with said view confirming image, wherein
said displaying section fixes a size of said frame when in said second state and also changes a display of said view confirming image based on said focal-length information.

10. The camera according to claim 9, further comprising
a zooming section adjusting a display area of said view confirming image by one of optically and electronically changing a magnifying power of said second image pickup section.

11. The camera according to claim 10, wherein
said displaying section performs a warning indication indicative of a limit of the variable range of a magnifying power on one of a telescopic side and a wide-angle side of said zooming section, based on said focal-length information.

12. The camera according to claim 9, wherein
said display processing section adjusts a display area by distorting said view confirming image by image processing.

13. The camera according to claim 9, wherein
said display processing section executes display processing that superimposes an indication indicative of a focal length of said second image pickup section onto said view confirming image.

14. The camera according to claim 9, further comprising
a calculating section calculating parallax between said first image pickup section and said second image pickup section based on said focal-length information, wherein
said display processing section electronically corrects a position of said frame with respect to said view confirming image based on a data of said parallax.

15. The camera according to claim 9, further comprising
a calculating section calculating parallax between said first image pickup section and said second image pickup section based on said focal-length information, wherein
said display processing section electronically corrects a display area of said view confirming image based on a data of said parallax.

16. The camera according to claim 9, wherein
said second image pickup section is configured with an external camera unit capable of mounting and dismounting to the camera body.

17. A camera, comprising:
a first image pickup section photographing a recording-purpose image;
a viewfinder optical system including an eyepiece section capable of observing an optical image of a subject with a light flux from a photographing optical path of said first image pickup section;
a second image pickup section photographing a view confirming image from an optical path different from that of said first image pickup section;
a zooming section adjusting a display area of said view confirming image by electronically changing a magnifying power of said second image pickup section;
a displaying section providing said eyepiece section with said view confirming image; and
a controlling section switching between a first state to provide said eyepiece section with said optical image and a second state to provide said eyepiece section with said view confirming image.

18. The camera according to claim 17, wherein
said second image pickup section is configured with an external camera unit capable of mounting and dismounting to the camera body.

19. A camera comprising:
a first image pickup section photographing a recording-purpose image;

a viewfinder optical system including an eyepiece section capable of observing an optical image of a subject with a light flux from a photographing optical path of said first image pickup section;

a second image pickup section photographing a view confirming image from an optical path different from that of said first image pickup section;

a displaying section providing said eyepiece section with said view confirming image; and a controlling section switching between a first state to provide said eyepiece section with said optical image and a second state to provide said eyepiece section with said view confirming image, and also causing said displaying section to display said recording-purpose image after photographing of said recording-purpose image.

20. The camera according to claim 19, wherein said second image pickup section is configured with an external camera unit capable of mounting and dismounting to the camera body.

21. A camera comprising:

a first image pickup section photographing a recording-purpose image;

a viewfinder optical system including an eyepiece section capable of observing an optical image of a subject with a light flux from a photographing optical path of said first image pickup section;

a second image pickup section photographing a view confirming image from an optical path different from that of said first image pickup section;

a displaying section providing said eyepiece section with said view confirming image; and a controlling section switching between a first state to provide said eyepiece section with said optical image and a second state to provide said eyepiece section with said view confirming image, and also causing said displaying section to display at least one of a reproduced image of said recording-purpose image and a setting screen of the camera when in said second state.

22. The camera according to claim 21, wherein said second image pickup section is configured with an external camera unit capable of mounting and dismounting to the camera body.

* * * * *